(12) United States Patent
Radtke et al.

(10) Patent No.: US 8,358,964 B2
(45) Date of Patent: Jan. 22, 2013

(54) METHODS AND SYSTEMS FOR COLLECTING RESPONSES

(75) Inventors: Todd N. Radtke, Hastings, MN (US);
Philip R. Moulton, Faribault, MN (US);
Craig Emmerich, River Falls, WI (US);
Robbie A. Nielsen, Prior Lake, MN (US); Hugh Eugene Watson, Prior Lake, MN (US)

(73) Assignee: Scantron Corporation, Irvine, CA (US)

( * ) Notice: Subject to any disclaimer, the term of this patent is extended or adjusted under 35 U.S.C. 154(b) by 1309 days.

(21) Appl. No.: 12/108,325

(22) Filed: Apr. 23, 2008

(65) Prior Publication Data
US 2008/0264701 A1 Oct. 30, 2008

Related U.S. Application Data

(60) Provisional application No. 60/913,968, filed on Apr. 25, 2007.

(51) Int. Cl.
*G09B 7/00* (2006.01)
*G09B 3/00* (2006.01)
*G06F 3/037* (2006.01)
*H04N 1/40* (2006.01)
*H04N 1/024* (2006.01)
*G06K 9/66* (2006.01)
*G06K 9/56* (2006.01)
*G06K 9/62* (2006.01)
*G06K 9/68* (2006.01)

(52) U.S. Cl. ........ 434/353; 345/179; 434/323; 358/468; 358/473; 382/193; 382/195; 382/205; 382/209; 382/217

(58) Field of Classification Search .................. 345/179; 235/472.03; 434/323, 353; 358/1.1–1.18, 358/468, 473; 382/193, 195, 205, 209, 217, 382/240
See application file for complete search history.

(56) References Cited

U.S. PATENT DOCUMENTS 3,050,248 A 8/1962 Lindquist
(Continued)

FOREIGN PATENT DOCUMENTS

FR 2728984 A1 7/1996
(Continued)

OTHER PUBLICATIONS

U.S. Non-Final Office Action for U.S. Appl. No. 11/383,007 dated Jun. 1, 2009 (12 pages).
(Continued)

*Primary Examiner* — Xuan Thai
*Assistant Examiner* — Michael Grant
(74) *Attorney, Agent, or Firm* — Fish & Richardson P.C.

(57) ABSTRACT

Implementations feature scannable form techniques and systems. Some aspects feature an apparatus that includes a pen-camera device, an electronic clipboard to store the pen-camera device, and a docking station for the clipboard. The clipboard includes a retention clip to hold a form on a substantially planar surface, and a pen-camera storage compartment to store the pen-camera device. The clipboard includes a power supply interface for charging the pen-camera device, a communication interface to transmit image and location data from the pen-camera device, and electrical interfaces for the clipboard docking station. The pen-camera device can mark response data on the form, optically scan response data and location data on the form, and associate time-stamped information for the marked responses on the form for error checking and fraud detection. The scannable form can include an area for encoded information that identifies a location and arrangement of a position-coding pattern on the form.

17 Claims, 26 Drawing Sheets

U.S. PATENT DOCUMENTS

| | | | |
|---|---|---|---|
| 3,445,942 A | 5/1969 | Azure | |
| 3,900,961 A | 8/1975 | Sokolski et al. | |
| 4,424,587 A | 1/1984 | Wevelsiep et al. | |
| 4,517,622 A | 5/1985 | Male | |
| 4,764,120 A | 8/1988 | Griffin et al. | |
| 4,768,087 A | 8/1988 | Taub et al. | |
| 4,793,813 A | 12/1988 | Bitzer et al. | |
| 4,857,715 A | 8/1989 | Koch et al. | |
| 4,937,439 A | 6/1990 | Wanninger et al. | |
| 5,085,587 A | 2/1992 | DesForges et al. | |
| 5,161,118 A | 11/1992 | Matsuda et al. | |
| 5,247,138 A | 9/1993 | Landmeier | |
| 5,273,437 A | 12/1993 | Caldwell et al. | |
| 5,303,042 A | 4/1994 | Lewis et al. | |
| 5,379,213 A | 1/1995 | Derks | |
| 5,420,407 A | 5/1995 | Grundy, Jr. | |
| 5,437,555 A | 8/1995 | Ziv | |
| 5,513,994 A | 5/1996 | Kershaw et al. | |
| 5,529,501 A | 6/1996 | Maruyama | |
| 5,586,889 A | 12/1996 | Goodman | |
| 5,618,182 A | 4/1997 | Thomas | |
| 5,640,152 A | 6/1997 | Copper | |
| 5,704,029 A | 12/1997 | Wright | |
| 5,712,906 A | 1/1998 | Grady et al. | |
| 5,724,357 A | 3/1998 | Derks | |
| 5,730,602 A | 3/1998 | Gierhart et al. | |
| 5,743,746 A | 4/1998 | Ho et al. | |
| 5,769,643 A | 6/1998 | Stevens | |
| 5,775,918 A | 7/1998 | Yanagida et al. | |
| 5,779,486 A | 7/1998 | Ho et al. | |
| 5,823,788 A | 10/1998 | Lemelson et al. | |
| 5,833,468 A | 11/1998 | Guy et al. | |
| 5,842,871 A | 12/1998 | Cutler et al. | |
| 5,850,250 A | 12/1998 | Konopka et al. | |
| 5,852,434 A | 12/1998 | Sekendur | |
| 5,945,656 A | 8/1999 | Lemelson et al. | |
| 5,947,747 A | 9/1999 | Walker et al. | |
| 5,974,444 A | 10/1999 | Konrad | |
| 6,002,387 A | 12/1999 | Ronkka et al. | |
| 6,018,617 A | 1/2000 | Sweitzer et al. | |
| 6,079,624 A | 6/2000 | Apperson et al. | |
| 6,086,381 A | 7/2000 | Downs et al. | |
| 6,112,049 A | 8/2000 | Sonnenfeld | |
| 6,120,299 A | 9/2000 | Trenholm et al. | |
| 6,144,838 A | 11/2000 | Sheehan | |
| 6,149,441 A | 11/2000 | Pellegrino et al. | |
| 6,155,840 A | 12/2000 | Sallette | |
| 6,162,060 A | 12/2000 | Richard et al. | |
| 6,164,975 A | 12/2000 | Weingarden et al. | |
| 6,175,841 B1 | 1/2001 | Loiacono | |
| 6,180,894 B1 | 1/2001 | Chao et al. | |
| 6,181,910 B1 | 1/2001 | Jerrold et al. | |
| 6,198,904 B1 | 3/2001 | Rosen | |
| 6,249,276 B1 | 6/2001 | Ohno | |
| 6,263,439 B1 | 7/2001 | Hondros et al. | |
| 6,272,245 B1* | 8/2001 | Lin | 382/195 |
| 6,330,976 B1 | 12/2001 | Dymetman et al. | |
| 6,366,760 B1 | 4/2002 | Kucinski et al. | |
| 6,419,496 B1 | 7/2002 | Vaughan | |
| 6,427,063 B1 | 7/2002 | Cook et al. | |
| 6,549,751 B1 | 4/2003 | Mandri | |
| 6,570,104 B1 | 5/2003 | Ericson et al. | |
| 6,603,464 B1* | 8/2003 | Rabin | 345/179 |
| 6,663,008 B1 | 12/2003 | Pettersson et al. | |
| 6,667,695 B2 | 12/2003 | Pettersson et al. | |
| 6,674,427 B1 | 1/2004 | Pettersson et al. | |
| 6,695,216 B2 | 2/2004 | Apperson | |
| 6,736,319 B2 | 5/2004 | Swanson et al. | |
| 6,752,317 B2 | 6/2004 | Dymetman et al. | |
| 6,760,748 B1 | 7/2004 | Hakim | |
| 6,786,396 B2 | 9/2004 | Constantine | |
| 6,807,535 B2 | 10/2004 | Goodkovsky | |
| 6,810,232 B2 | 10/2004 | Knowles et al. | |
| 6,933,919 B1 | 8/2005 | Anderson et al. | |
| 6,964,374 B1 | 11/2005 | Djuknic et al. | |
| 6,968,085 B2* | 11/2005 | Bern et al. | 382/218 |
| 6,970,267 B1 | 11/2005 | Scanlon | |
| 6,971,574 B1* | 12/2005 | Herskowitz | 235/386 |
| 7,068,861 B2 | 6/2006 | Swanson et al. | |
| 7,134,606 B2* | 11/2006 | Chou | 235/494 |
| 7,167,164 B2 | 1/2007 | Ericson et al. | |
| 7,176,896 B1* | 2/2007 | Fahraeus et al. | 345/173 |
| 7,298,901 B2 | 11/2007 | McIntosh et al. | |
| 7,444,159 B2 | 10/2008 | Poo et al. | |
| 7,889,929 B2* | 2/2011 | Ashikaga | 382/195 |
| 2001/0018178 A1 | 8/2001 | Siefert | |
| 2002/0031755 A1 | 3/2002 | Lo et al. | |
| 2002/0090565 A1 | 7/2002 | Griffith et al. | |
| 2002/0107681 A1 | 8/2002 | Goodkovsky | |
| 2003/0017442 A1 | 1/2003 | Tudor et al. | |
| 2003/0042299 A1 | 3/2003 | Swanson | |
| 2003/0067404 A1 | 4/2003 | Ruha et al. | |
| 2003/0108856 A1 | 6/2003 | Masuda | |
| 2003/0180703 A1 | 9/2003 | Yates et al. | |
| 2004/0036682 A1 | 2/2004 | Zobuchi | |
| 2004/0085287 A1 | 5/2004 | Wang et al. | |
| 2004/0086191 A1* | 5/2004 | Wang et al. | 382/240 |
| 2004/0140357 A1* | 7/2004 | Cummings | 235/386 |
| 2004/0259067 A1* | 12/2004 | Cody et al. | 434/323 |
| 2005/0013104 A1* | 1/2005 | Feague et al. | 361/683 |
| 2005/0099409 A1* | 5/2005 | Brouhon | 345/179 |
| 2005/0226541 A1 | 10/2005 | McIntosh et al. | |
| 2005/0237580 A1 | 10/2005 | Coleman et al. | |
| 2005/0238260 A1 | 10/2005 | Coleman et al. | |
| 2006/0003306 A1 | 1/2006 | McGinley et al. | |
| 2006/0081714 A1* | 4/2006 | King et al. | 235/472.03 |
| 2006/0082557 A1* | 4/2006 | Ericson et al. | 345/179 |
| 2006/0151602 A1 | 7/2006 | Hawkins et al. | |
| 2006/0192772 A1 | 8/2006 | Kambayashi | |
| 2006/0202031 A1 | 9/2006 | Chung et al. | |
| 2006/0242560 A1* | 10/2006 | Wang et al. | 715/513 |
| 2006/0255145 A1 | 11/2006 | Chung et al. | |
| 2006/0256097 A1 | 11/2006 | Oliver | |
| 2007/0031802 A1 | 2/2007 | Koyama et al. | |
| 2007/0160971 A1* | 7/2007 | Caldera et al. | 434/353 |
| 2007/0170253 A1 | 7/2007 | Chung et al. | |
| 2008/0114777 A1* | 5/2008 | Albarran Moyo et al. | 707/100 |
| 2008/0164329 A1* | 7/2008 | Piorun et al. | 235/50 B |
| 2008/0181501 A1* | 7/2008 | Faraboschi et al. | 382/179 |
| 2009/0020606 A1 | 1/2009 | Chung et al. | |
| 2009/0116748 A1 | 5/2009 | Davison et al. | |
| 2009/0128520 A1* | 5/2009 | Combe | 345/179 |
| 2009/0186327 A1 | 7/2009 | McGinley et al. | |
| 2009/0201541 A1 | 8/2009 | Neogi et al. | |
| 2009/0242639 A1 | 10/2009 | Holenstein et al. | |
| 2009/0289115 A1 | 11/2009 | Chung et al. | |
| 2010/0012541 A1 | 1/2010 | Neary | |
| 2010/0047757 A1 | 2/2010 | McCurry et al. | |
| 2010/0068688 A1 | 3/2010 | Shapiro | |

FOREIGN PATENT DOCUMENTS

| | | |
|---|---|---|
| WO | WO 01/16691 | 3/2001 |
| WO | WO0116691 A1 | 3/2001 |
| WO | WO0231799 A1 | 4/2002 |
| WO | W02008134421 A2 | 11/2008 |

OTHER PUBLICATIONS

U.S. Final Office Action for U.S. Appl. No. 11/383,007 dated Nov. 5, 2009 (16 pages).

U.S. Non-Final Office Action for U.S. Appl. No. 11/383,007 dated May 10, 2010 (18 pages).

U.S. Non-Final Office Action for U.S. Appl. No. 11/383,007 dated Aug. 31, 2010 (17 pages).

U.S. Final Office Action for U.S. Appl. No. 11/383,007 dated Jan. 14, 2011 (17 pages).

International Search Report, Application Serial No. PCT/US08/61412, Oct. 15, 2008, 17 pages.

Anoto Group AB, 1 page, http://www.anotofunctionality.com/?id=917 (visited Apr. 23, 2008).

Skills Connection, 2000-2001, 2 pages, http://www.edvision.com/skillsconnection/sc_details.html (visited Aug. 22, 2001).

Argus Communications, 2000, 1 page, http://www.argus.com/ (visited Aug. 9, 2001).

LearnStar Mission, 2001, 4 pages, http://www.learnstar.com/about_us.html (visited Aug. 8, 2001).

Renaissance Learning, 2001, 4 pages, http://www.renlearn.com/aboutus.htm (visited Aug. 7, 2001).

News Release. Renaissance Learning Announces New Software Products Wisconsin Rapids, WI. Jan. 24, 2001, 2 pages.

Richards et al., U.S. Appl. No. 10/647,103, filed Aug. 21, 2003, entitled "Attendance Module", 151 pages.

Nobis et al., U.S. Appl. No. 10/236,528, filed Sep. 6, 2002, entitled "Infrared Information Exchange", 109 pages.

Non-Final Office Action issued in U.S. Appl. No. 10/236,528, on Mar. 2, 2004, 8 pages.

Nobis et al., U.S. Appl. No. 10/236,493, filed Sep. 6, 2002, entitled "Network-Based Testing", 114 pages.

Non-Final Office Action issued in U.S. Appl. No. 10/236,493, on Jan. 3, 2005, 9 pages.

Non-Final Office Action issued in U.S. Appl. No. 10/174,085, on Sep. 3, 2004, 8 pages.

Final Office Action issued in U.S. Appl. No. 10/174,083, on Apr. 7, 2005, 8 pages.

International Search Report and Written Opinion for International Application No. PCT/US11/22424 mailed Jun. 1, 2011, 15 pages.

International Preliminary Report on Patentability in International Application No. PCT/US2011/22424, mailed Jun. 11, 2012, 11 pages.

* cited by examiner

Census 2010

This is your official form for all the people at this address. It is quick and easy, and your answers are protected by law. Complete the Census and help your community get what it needs - today and in the future!

Make your characters like this, staying inside the boxes:

| A | B | C | D | E | F | G | H | I | J | K | L | M | N | O | P | Q | R |
| S | T | U | V | W | X | Y | Z | 0 | 1 | 2 | 3 | 4 | 5 | 6 | 7 | 8 | 9 |

Start Here — Please use a black or blue pen.
- Use black or blue pen or a number 2 pencil.
- Make dark marks that fill the oval completely.
- Do not use pens with ink that soaks through the paper.

Household

1 What is the address of this residence?

House Number

Street

City

2 How many people were living or staying in this house, apartment, etc. on April 1, 2010?

☐☐ Number of people

INCLUDE in this number:
- foster children, roomers, or housemates
- people staying here on April 1, 2010 who have no other permanent place to stay
- People living here most of the time while working, even if they have another place to live DO NOT INCLUDE in this number:
- college students living away while attending college
- people who live or stay at another place most of the time

3 Which best describes this building?
○ A one-family house detached from any other house
○ A one-family house attached to one or more houses
○ A building with 2 apartments
○ A building with 3 or 4 apartments
○ A building with 5 to 9 apartments
○ A building with 10 to 19 apartments
○ A building with 20 or more apartments
○ RV, van, etc.

Check this box first and ☐ then scan the bar code.

4 Is this house, flat, etc. - (Mark only one.)
○ Owned by you or someone in this household with a mortgage or loan?
○ Owned by you or someone in this household free and clear?
○ Rented?
○ Occupied without payment of cash rent?

5 In which year was this dwelling built?
○ Before 1970   ○ 1996 - 2000
○ 1970 - 1979   ○ 2001 - 2005
○ 1980 - 1989   ○ 2006 or newer
○ 1991 - 1995   ○ Don't know

6 What is the construction material of the outer walls?
○ Wood                      ○ Brick
○ Concrete/Concrete Blocks  ○ Adobe
○ Wood & Concrete           ○ Don't know
○ Stone                     ○ Other, please specify

7 What is the material used for roofing?
○ Sheet metal (zinc,        ○ Shingle (other)
  aluminum, galvanize,      ○ Tile
  galvalume)                ○ Concrete
○ Shingle (asphalt)         ○ Makeshift/thatched
                            ○ Don't know
○ Shingle (wood)            ○ Other, please specify

8 What material is used for the flooring?
○ Carpet     ○ Tile
○ Concrete   ○ Wood
○ Dirt       ○ Other, please specify

9 Do you have electricity?           ○ Yes ○ No
10 Do you have telephone service?    ○ Yes ○ No
11 Do you have mobile telephone service? ○ Yes ○ No
12 How is water supplied to your home?
○ Carried in containers   ○ Plumbing
○ Common cistern          ○ Well
○ Lake/Stream             ○ Other, please specify
○ Pipe

PLEASE DO NOT WRITE IN THIS AREA

FIG. 3

Figure 17A:
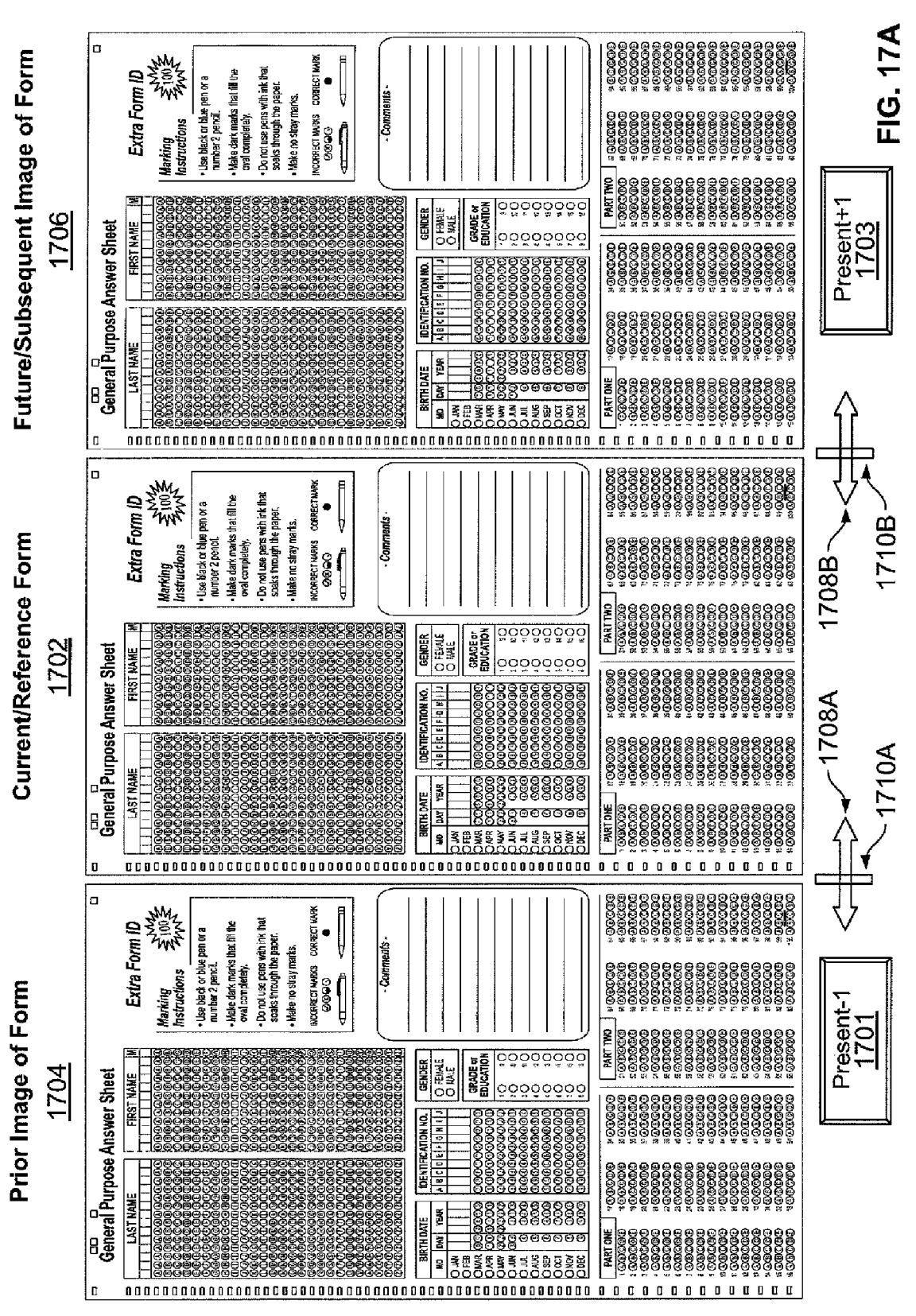

Prior Image of Form     Current/Reference Form     Future/Subsequent Image of Form
1704     1702     1706

Present−1
1701

1708A     1708B
1710A     1710B

Present+1
1703

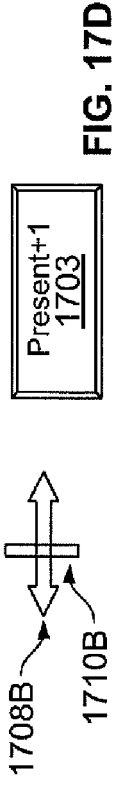
FIG. 17D

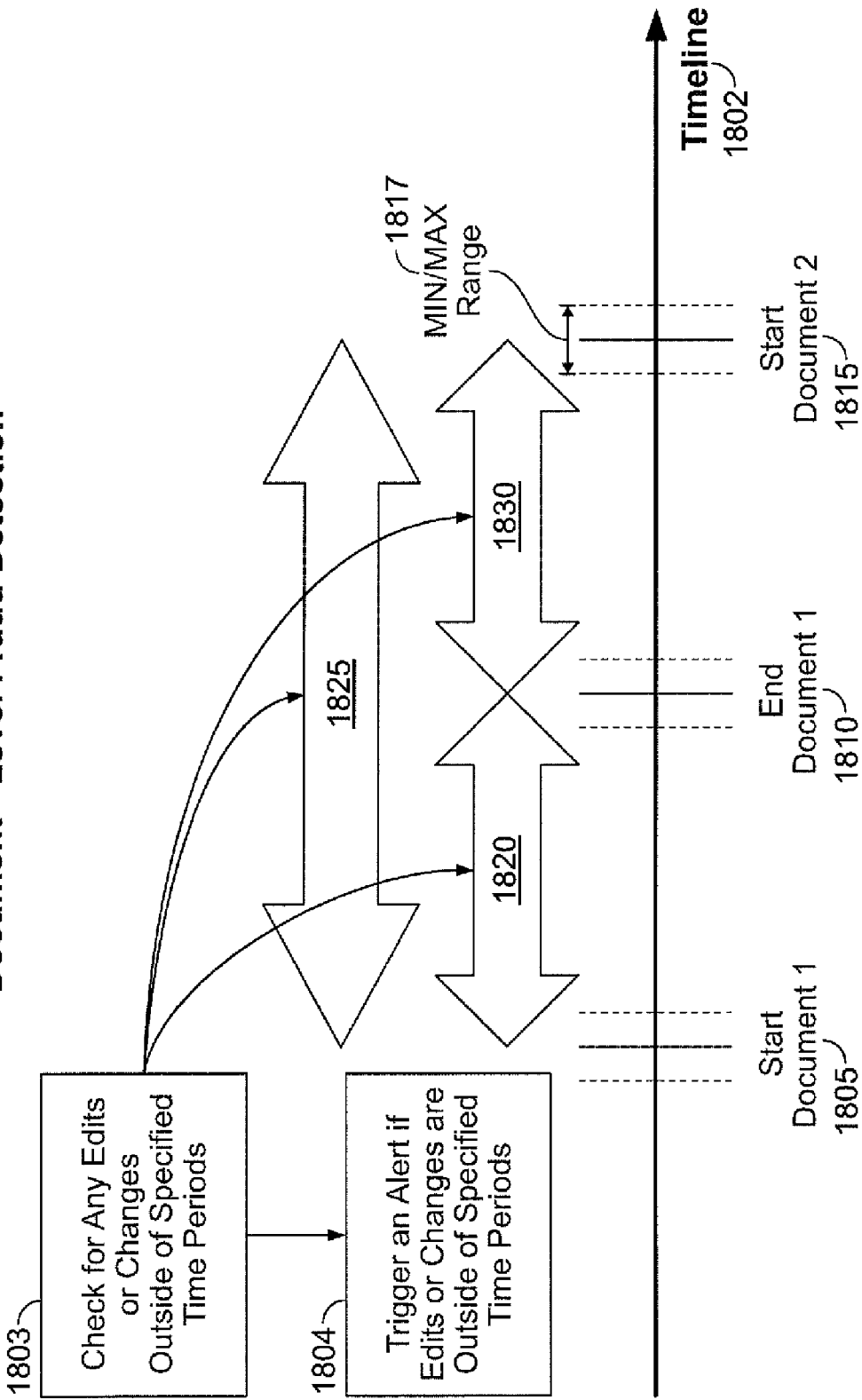

METHODS AND SYSTEMS FOR COLLECTING RESPONSES

CROSS REFERENCE TO RELATED APPLICATION

This application claims the benefit of priority from U.S. Provisional Application entitled "Method and System for Collecting Responses", Application No. 60/913,968, filed Apr. 25, 2007, the disclosure of which is incorporated by reference.

TECHNICAL FIELD

The present disclosure relates to systems and techniques for scanning or collecting written data, such as data collected from a scannable form or a writing implement.

BACKGROUND

A variety of forms are in daily use that can facilitate a collection of responses from users of the forms. A few examples include forms for educational tests, patient questionnaires used at medical or dental offices, voting ballots, product surveys, consumer preference surveys, requests for services, and job applications. Many of these forms have been designed to allow for the automated collection of the response information using scanners.

For example, answers to closed-ended questions, such as multiple-choice questions, can be obtained using an optical mark recognition (OMR) system. In one such system, a user can record answers by marking specified areas on a form, e.g., in predefined ovals or squares, which correspond to multiple choice answers or true-false answers. The presence of a mark by a test taker, such as a filled-in oval, can be read by a scanner.

Open-ended questions may also be processed with the assistance of a computer system. An open-ended question on a form can allow a responder to formulate a response, as opposed to choosing from a menu of predetermined choices. Some systems can provide for optical character recognition of handwritten text with answers to the open-ended question on the form. Many of these forms are printed on paper and are designed in a format so that scanners and associated software can be used to scan the filled-in form, electronically obtain the response markings, determine the response data, and insert the response data into a database.

Details of one or more implementations are set forth in the accompanying drawings and description herein. Other features, aspects, and advantages will be apparent from the description, the drawings, and the claims.

SUMMARY

The present disclosure describes techniques and systems generally associated with data collection and/or fraud detection for scannable forms.

In one implementation, a method of creating a form for collection of responses from users of the form involves providing a surface including a position-coding pattern located on the surface. The position-coding pattern is optically detectable by a hand-held, pen-camera device, and two or more location marks indicating a referenceable physical location on the surface. The location marks are detectable by an optical scanner device. The method includes defining a form layout indicating content and position information for two or more response areas for receipt of information from a user and printing the form layout on the surface, where the response areas are positioned in a specified location relative to the location marks.

In another general implementation, a system for creating a form for collection of responses from users of the form includes a form definition system for defining a form layout that indicates content and position information for at least two response areas for receipt of information from a user. The system further includes a surface having the form layout printed on the surface. The surface includes a position-coding pattern located on the surface, and two or more location marks indicating a referenceable physical location on the surface. The response areas are positioned in a specified location relative to the location marks. The system further includes a hand-held pen-camera device for optically detecting the position-coding pattern and visibly marking the surface with response marks, and an optical scanner for optically detecting the location marks and the response marks.

In yet another implementation, a method of creating a form layout for collection of responses from users of the form includes creating a form definition file for a surface using a virtual coordinate system defining horizontal and vertical positions on the surface. The creation of the form definition file includes defining a location on the virtual coordinate system for two or more location marks indicating a referenceable physical location on the surface. The location marks are detectable by an optical scanner device. The method involves entering content for two or more response queries, defining at least one response area corresponding to each response query for receipt of information from the user, and defining a shape and location of response areas on the virtual coordinate system. The method further includes applying a position-coding pattern to the surface of the form, where the position-coding pattern is optically detectable by a hand-held pen device. Based on the form definition file, a spatial index describing the shape and location of each response area on the position coding pattern is defined.

Other implementations involve a method of collecting data from a paper form having multiple response areas for a user to mark response areas to indicate data. The method includes creating a form definition file for the paper form, where a location of each response area is identified on a virtual coordinate system, and presenting the paper form and a writing system to the user. The writing system is used to handwrite answers in the response areas, where the writing system is configured to determine and store the path of the handwriting on the virtual coordinate system. The method further includes scanning the paper form to generate a results report of the data on the paper form.

In general, in one aspect, implementations feature a system for the collection of responses from users of scannable forms. The system includes a scannable form including: a position-coding pattern including a number of unique patterns; at least two response areas for receipt of information from a user of the form; and two or more location marks indicating a referenceable physical location on the scannable form. The response areas are positioned in a specified relation to the location marks. The system includes a pen-camera device for optically detecting the position-coding pattern and marking the scannable form with response marks in at least one of the response areas, where the pen-camera device is configured to have a location of the pen-camera device on the scannable form identified with the position-coding pattern. The system also has a form definition file for defining a form first layout for referencing content and position information for the at least two response areas, and a second form layout for the position-coding pattern for identifying locations of the pen-camera device on the scannable form when marking the scannable form.

These and other implementations can optionally include one or more of the following features. The system can include an optical scanner for optically detecting the location marks and the response marks, and the position-coding pattern can be invisible to a human eye. The location marks can have timing marks that are located along one edge of the scannable form, where at least one of the timing marks can be horizontally aligned with at least one response field. The location marks can be superimposed on the position-coding pattern.

In general, in other aspects, implementations feature a method for collecting data from a form. The method includes marking a scannable form with a pen-camera device. The scannable form includes: a position-coding pattern including a number of unique patterns; and at least two response areas for receipt of information from a user of the form. The method includes receiving scanned response data from the scannable form, reading location information from a pen-camera device, and the pen-camera device optically detecting the location information using the position-coding pattern when marking the scannable form with response marks. When reading the location information, the method includes referencing a form definition file that defines a first form layout for indicating content and position information for at least two response areas, and a second form layout for the position-coding pattern for identifying locations of the pen-camera device on the scannable form when marking the scannable form.

These and other implementations can optionally include one or more of the following features. The method can involve using the location information to track a path of the pen-camera device on the scannable form, and storing the location information from the pen-camera device and the received scanned response data from the scannable form.

In general, in other aspects, implementations feature a device for scanning data that includes a pen-camera device. The device includes an electronic clipboard configured to store the pen-camera device that includes: a substantially planar surface for positioning a form; a retention clip to hold the form on the substantially planar surface; a pen-camera storage compartment to store the pen-camera device; a power supply interface for charging the pen-camera device; and a communication interface to transmit image and location data from the pen-camera device.

These and other implementations can optionally include one or more of the following features. The pen-camera device can be configured to mark on a scannable form and read response marks and position-coding patterns from the scannable form. The electronic clipboard can include a battery compartment to store a battery, a first light-emitting diode (LED) indicator to show a battery status, and a second LED indicator to show a data downloading status. The interfaces can be configured to couple to an electronic clipboard docking station for power and data communication. The electronic clipboard can be configured to wirelessly transmit the image and location data to an electronic clipboard docking station.

In general, in other aspects, implementations feature a clipboard docking station for a pen-camera clipboard that includes a first power supply interface to couple to a first clipboard power supply interface, and a first communication interface to couple to a first clipboard communication interface to receive image and location data from the pen-camera clipboard. The image data includes data scanned from a pen-camera device that is transmittable to the pen-camera clipboard, and the location data includes data received from the pen-camera device that indicates a location of pen-camera device markings on a scannable form. Software stored on the electronic clipboard and/or the docking station can be used to control the interfaces.

These and other implementations can optionally include one or more of the following features. The clipboard docking station can have a second power supply interface to couple to a second clipboard power supply interface, and a second communication interface to couple to a second clipboard communication interfaced to receive image and location data from another pen-camera clipboard.

In general, in other aspects, implementations feature a scannable form for collecting responses from a scannable form that includes a position-coding pattern located on the scannable form, where the position-coding pattern is optically detectable by a pen-camera device. The form includes at least two location marks indicating a referenceable physical location on the scannable form, where the location marks are detectable by an optical scanner device. The form has at least two response areas for receipt of information from a user of the scannable form, in which the response areas are positioned in a specified relation to the location marks. The form includes an area for encoded information that identifies a location and arrangement of the position-coding pattern on the scannable form.

These and other implementations can optionally include one or more of the following features. The location marks can include timing marks that are located along one edge of the scannable form, where at least one of the timing marks can be horizontally aligned with at least one response field. The area for the encoded information can further identify a type of scannable form. The encoded information can include binary encoded information. The position-coding pattern can be invisible to a human eye, and the location marks can superimposed on the position-coding pattern. The encoded information may be barely noticeable on the form to a human eye.

In general, in other aspects, implementations feature a method for collecting responses from a scannable form. The method includes reading a position-coding pattern located on the scannable form with a pen-camera device, and reading at least two location marks indicating a referenceable physical location on the scannable form with an optical scanner device. The method also includes reading at least two response areas for receipt of information from a user of the scannable form, in which the response areas are positioned in a specified relation to the location marks. The method involves reading encoded information from a region of the scannable form that identifies a location and arrangement of the position-coding pattern on the scannable form.

These and other implementations can optionally include one or more of the following features. The location marks can be timing marks that are located along one edge of the scannable form, where at least one of the timing marks can be horizontally aligned with at least one response field. The method can involve using the encoded information to identify a type of scannable form, and the encoded information includes binary encoded information. The encoded information can be located between consecutive response fields in the form. The method can involve using the encoded information to provide computer instructions for data collection from at least two response areas. The position-coding pattern can be invisible to a human eye, and the location marks can be superimposed on the position-coding pattern.

In general, in other aspects, implementations feature a computer-implemented method for correcting data on an image of a scannable form displayed on a graphical user interface (GUI). The computer-implemented method involves, in a reference image of the scannable form including at least two location marks indicating a referenceable physical location on the scannable form and at least two response areas for receipt of response data from a user of the scannable form, checking the reference image of the scannable form to determine an error regarding an entry for response data. The method also involves correcting the error by receiving instructions from a first slider control on the GUI to move at least some of the response data between the reference image of the scannable form and a prior image of the scannable form, or correcting the error by receiving instructions from a second slider control on the GUI to move at least some of the response data between the reference image of the scannable form and a subsequent image of the scannable form.

These and other implementations can optionally include one or more of the following features for the computer-implemented method. The error can include an error in a response area of one of the images of the scannable form where there is overwritten data, incomplete data, or an error related to response data located in an incorrect location on the scannable form. Correcting the error can also involve moving at least some of the overwritten data from a response area on one of the images of the form to a similar response area on another image of the form. The response data can be handwritten response data.

The computer-implemented method for correcting the error can involve moving at least some of the incomplete data from a response area on one of the images of the scannable form to a similar response area on one of the other images of the scannable form. In some implementations, correcting the error further includes receiving instructions from the first slider control on the GUI to move at least some of the response data from the reference image of the scannable form to the prior image of the scannable form, or to move the response data from the prior image of the scannable form to the reference image of the scannable form. In some implementations, correcting the error further can include receiving instructions from the second slider control on the GUI to move at least some of the response data from the reference image of the scannable form to the subsequent image of the scannable form, or to move the response data from the subsequent image of the scannable form to the reference image of the scannable form.

In some implementations of the computer-implemented method, the method can also include concurrently or simultaneously displaying at least two of the images on the GUI. The respective form images can be displayed side-by-side on the GUI. The response data to be moved between the different form images can be handwritten response data.

In general, in other aspects, implementations feature a system for correcting data on an image of a scannable form. The system includes a graphical user interface (GUI) to concurrently display at least two images of the scannable form, where at least two of the images are images of the scannable form at different times, and where one of the images includes a reference image of the scannable form on the GUI that includes at least two location marks indicating a referenceable physical location on the scannable form and at least two response areas for receipt of response data from a user of the scannable form. The system includes a first slider control on the GUI to move at least some of the response data between the reference image of the scannable form and a prior image of the scannable form, and a second slider control on the GUI to move at least some of the response data between the reference image of the scannable form and a subsequent image of the scannable form.

These and other implementations can optionally include one or more of the following features. The system can be configured for the first or second slider controls to correct an error on at least one of the forms regarding an entry for the response data. The error can include an error in a response area of one of the images of the scannable form where there is overwritten data, incomplete data, or an error related to response data located in an incorrect location on the scannable form. The error can be related to handwritten data from a pen or pencil. The system can be configured to correct the error by moving at least some of the incomplete data or overwritten data from the response area on one of the images of the scannable form to a similar response area on one of the other images of the scannable form.

In general, in other aspects, implementations feature a computer-implemented fraud-detection method for scannable forms. The method involves, for a scannable form having at least two response areas for receipt of response data from a user of the scannable form, and a position-coding pattern that has multiple unique patterns, marking the scannable form with response marks using a pen-camera device, and tracking locations of the markings on the scannable form by using the pen-camera device to optically read the position-coding pattern when the pen-camera device marks the scannable form. The method includes associating time-stamping information with the response marks, collecting the response marks and the associated time-stamped information from the pen-camera device, and processing the time-stamped information to detect for fraudulent data on the scannable form by using the time-stamping information in at least one rule to trigger an alert when a condition of the rule is not satisfied.

These and other implementations can optionally include one or more of the following features. The scannable form further can include at least two location marks indicating a referenceable physical location on the scannable form. The location marks can include timing marks that are located along one edge of the scannable form, where at least one of the timing marks can be horizontally aligned with at least one response field. At least one of the rules in the fraud-detection method can include setting a minimum or maximum time duration for markings that occur in a time period between any of the following: a start of a document and an end of the document, a start of the document and an end of another document, the end of the document and the start of the other document, a start of a page of the document and the end of the page of the document, a start of a page of the document and the end of another page of the document, the end of the page of the document and the start the other page of the document, a start of a field of the page of the document and the end of the field of the page of the document, the start of the field of the page of the document and the end of another field of the page of the document, or the end of the field of the page of the document and the start of the other field of the page of the document. In some implementations, a condition of the at least one rule may not be satisfied if any markings occur outside of the time period. If the condition is not satisfied, any markings that occur outside of the time period can be rejected and/or flagged.

In general, in other aspects, any of the implementations herein feature a computer program product, encoded on a computer-readable medium, that includes instructions to cause data processing apparatus to perform operations of the method, system, or device.

Particular implementations can realize one or more of the following potential advantages. In some implementations, a scannable form includes response and location marks that can allow an optical scanner system to electronically capture the information on the completed form by referencing a form definition file associated with the form. In addition, a second electronic data gathering method is provided by tracking the path of the writing implement used to fill out the scannable form. The combination of using the optical scanner to scan the scannable form and the data for the tracking of the path of the writing implement can provide useful benefits of robustness, reliability, additional data error-checking and verification capabilities, and/or additional security in the event that either the scannable form or the data for the tracking of the path of the writing instrument is lost or damaged.

In other aspects when completing a paper form, a pen-camera device and electronic clipboard combination can be a convenient and useful tool in having a rigid, planar surface for supporting the paper forms and for having data to be downloaded from the pen-camera device. In some implementations, a number of helpful features can be integrated into the pen-camera clipboard to facilitate a workflow process that is often associated with a paper form. In particular, the clipboards can be especially useful in census, voting, and testing applications.

For example, the integrated pen-camera clipboard can hold a paper form in a stable position on a substantially planar surface using a retention clip. The pen-camera device can be conveniently stored within a pen compartment of the clipboard. The clipboard can also include an internal forms compartment for storing copies of the paper form, such as unused and completed forms.

The pen-camera clipboard can facilitate the process of downloading data from the pen-camera device, and having an interface (physical and/or wireless interfaces) for making an electrical connection with docking interface to allow data to be downloaded from the pen-camera device, and for recharging batteries within the pen-camera device. One or more pen-camera clipboards can be conveniently mated with a docking station for simultaneous power and data transfer to the multiple clipboard units.

In some implementations of a scannable form, a set of very narrow and thin lines and spaces can be used in the form in a binary encoding technique that provides information to identify characteristics of the form while using only a very small space on the form. In particular, the binary encoding technique can reveal information to identify a type of form to software interpreting scanned, binary-encoded information for the form. Also, the binary encoding can inform the software of how to gather the "ink" or the written data on the form, where the "ink" can also have information to reveal an emphasis of the data on the form, such as writing lightly or boldly in traditional handwriting.

In some implementations, the binary encoded information can be an identifier for a form stored in a system memory. Once the type of form is known, the software can have information to recognize exactly how the position-coding pattern is arranged on the form. In some implementations, the encoded information itself can disclose how the position-coding pattern is arranged on the form. In other implementations, the type of encoding can be non-binary encoding.

As for other potential advantages, tools are provided for error correction with respect to data collected for images of scannable forms. For example, three of the most common errors with pen-camera data collection can include: (1) the user either failing to properly indicate that a new form is being filled out, thus causing data from multiple forms to be combined on one form image; (2) the user inadvertently indicating that a new form is being filled out, thus causing the data from a single form image to be spread across two form images; and (3) the user partially filling out one form and then filling out another form before returning to the original form. In order to resolve these issues, a set of user-tunable rules using time-stamped information, which is saved with each ink stroke made with the pen-camera device, can be added to software associated with the pen-camera device. As a result, these errors related to pen-camera data collection can be corrected and/or notified to a user collecting the data or a user of the pen-camera device.

The disclosed software and systems can employ the pen-camera data in checking for several error situations: at least four situations of which there was not a notice or indication of a new form when the user started the new form; and at least three situations of when there was an incorrect notice or indication that a new form was started, or when a first form is completed after other subsequently-started forms have been completed. The disclosed techniques can allow the user (or data collector) to easily separate the overwritten data from a single form image amongst multiple form images based on when the data was written. The user (or data collector) can also combine data on a single form image from forms that had response data that were incorrectly separated into multiple form images. In some implementations, the software can use the missing data and/or time stamps for the overlaps in the response data to suggest the best possible correction. In some implementations, software can provide a convenient graphical user interface (GUI) for concurrently displaying multiple images of the form, with the multiple images representing various states (or snapshots) of the form at different times. In this aspect, the amount of time required for error correction can be reduced from manual techniques, if manual techniques could correct the form errors at all.

In other potential benefits, software associated with the pen-camera device can detect changes after or during data collection and recognize when a fraud-type situation had occurred or may be occurring. In such cases, the software can stop the pen-camera device user from making the edits, reject subsequent edits made by the user, or flag the edits so that they can be verified later. The fraud checking techniques can be for documents, pages of documents, or even for certain fields on a page of the document.

Details of one or more implementations are set forth in the accompanying drawings and the description herein. Other features, aspects, and advantages will be apparent from the description, the drawings, and the claims.

DESCRIPTION OF THE DRAWINGS

FIG. 3 is an example form for collecting data for a census, where the form layout includes open-ended questions and multiple choice questions.

FIGS. 17A-17G show example views of data changes on form images in time various periods.

FIGS. 18A-18C illustrate example fraud-detection mechanisms for documents, sheets, and document fields on a timeline.

Like reference numbers and designations in the various drawings can indicate like elements.

DETAILED DESCRIPTION

Figure 1:
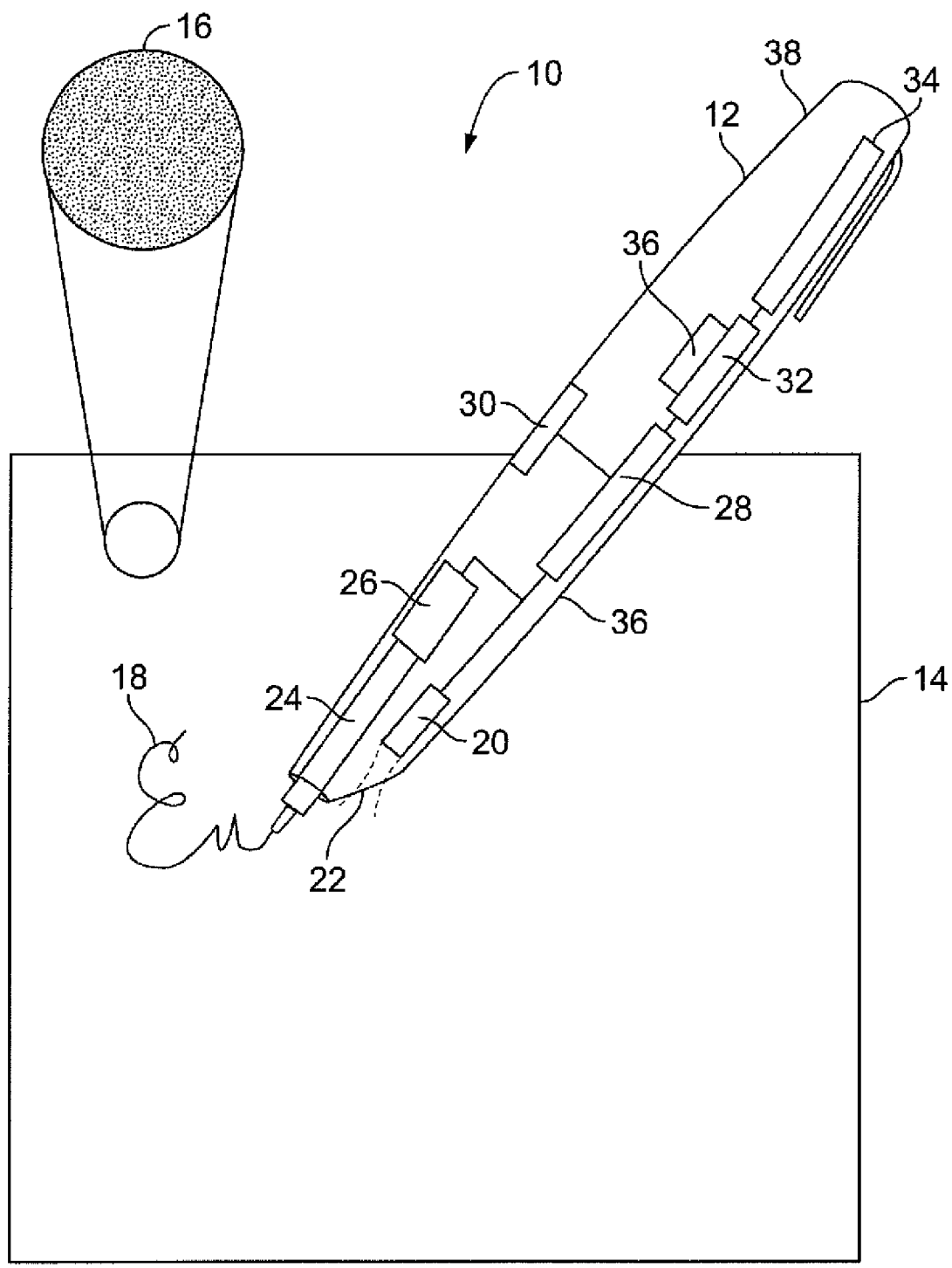
FIG. 1 is an example schematic drawing of a digital pen and paper system.

Digital pens and digital paper have been used to electronically gather information that is written on a special surface having a position-coding pattern. The term "digital pen" refers to a hand-held device that includes both a camera and a marking instrument for producing marks on a surface. The term "digital pen" and "pen-camera device" will be used interchangeably. The term "digital paper" refers to a surface, usually paper, that includes a position-coding pattern printed on it. Digital pen and paper systems capture handwriting and other markings that are written on the specially-coded piece of paper. One example of a commercially available digital paper system is the io™2 Digital Writing System from Logitech®, which includes the Logitech® io™2 Digital Pen and "Smart" Digital Paper. The "Smart" Digital Paper includes a position-coding pattern available from Anoto AB of Sweden.

Pen-Camera Device and Scannable Form with Multiple Patterns

Aspects of this disclosure relates to a system and method for automatically collecting response data from a form. For example, two different methods of collection of response data from a form are disclosed, that uses a single data file to define response fields for the form for both of the data collection methods.

In some implementations, a form includes location marks that allow an optical scanner system to electronically capture the information on the completed form by referencing a form definition file associated with the form. In addition, a second electronic data gathering method is provided by tracking the path of the writing implement used to fill out the form. The combination of the scannable form and the data for the tracking of the path of the writing implement can provide useful benefits of robustness, reliability, data error-checking and verification capabilities, and/or additional security in the event that either the scannable form or the data for the tracking of the path of the writing instrument is lost or damaged.

The form itself can have a position coding pattern printed on the form, which can have millions of small, unique patterns that are detectable by a scanning device, such as the pen-camera device. In some implementations, the millions of unique patterns may be invisible to the human eye. The forms can be multi-page forms, where each page has a pattern that is unique from another page. The multi-page forms can be copied so that similar pages in different copies of the multi-page forms have the same patterns.

The tracking of the writing implement can be accomplished by a number of different methods. For example, in some implementations, the form can include a position-coding pattern, so that when the user fills out the form using the pen-camera device the responses are electronically captured. In other implementations, the paper form can be positioned on a touch-sensitive surface while it is being marked by the user. The pressure applied to mark the form by the user will also cause the touch-sensitive surface to record the markings in this implementation. Other methods and systems for tracking the path of the writing implement while completing a form are also within the scope of the disclosure. These other methods and systems, such as a touch-sensitive surface, can take the place of the position-coding pattern and pen-camera device that are described herein in alternative implementations.

By providing two independent electronic data gathering methods, the accuracy of either method can be tested by comparing the data collected between the methods, without a requirement for manual data review or entry. Also, a common form definition file can be used for both methods in some implementations. In another aspect, data can be collected in two ways from the form. For example, a single form can be used even though, in some circumstances, the use of a pen-camera device will be preferred, while in other circumstances, traditional pencils or pens are preferred as a marking instrument for completing the same form.

Some conventional digital pen and paper technologies may involve digital pens that serve as replacements for scanning and optical character recognition (OCR) methods, so that scanning steps can be avoided. The conventional techniques, however, do not recognize the advantages in using both scanning technology and digital paper technology to collect data from a single form.

One example of a situation where the process of recording data using a digital pen could be improved is for the application of auditing data that has been digitally collected to ensure the accuracy of the data collection process. For example, if a paper voting ballot is marked using a digital pen-camera device and a position-coding pattern, the voting data is recorded by downloading the path information from the pen-camera device. The data may be audited to make sure that the digital data matches what the voter marked on the paper ballot. This automated process can save time over conventional auditing. Typically to undertake an audit process, people would have to compare paper ballots or an image of the paper ballots to the digital data, which can be very labor intensive and time-consuming.

Another situation arises if one of the digital pen-camera devices is lost. For example, if a census taker is using a pen-camera device and a position-coded form to collect census data while walking through neighborhoods, the census data can be recorded on paper and digitally recorded in the memory of the pen-camera device. So if the pen-camera device is misplaced, the census data can be kept based on the paper forms.

In some implementations, the form has a surface that includes both a position-coding pattern and location marks to facilitate first and second methods of electronic data collection.

Tracking the Writing Implement's Path via the Pen-Camera Device

FIG. 1 is an example schematic drawing of a digital pen and paper system. As illustrated in FIG. 1, a digital pen and paper system 10 includes a pen-camera device 12 and a surface 14. The surface 14 includes a position-coding pattern 16, which is shown in an exploded view. The position-coding pattern 16 can have thousands or millions of unique patterns. The position-coding pattern 16 is readable by a scanner or camera within the pen device. If a small segment of the position-coding pattern 16 is detected by a scanner, then the location of the pen device on the surface 14 can be determined with certainty. The position-coding pattern can be of any one of various known configurations, such as those developed by Anoto AB of Lund, Sweden.

In one example of a position-coding pattern, the placement of symbols and their relationships to each other can indicate a coordinate position (e.g., a horizontal, vertical position). Each symbol can include a mark, such as a small dot, and a nominal position or spatial reference point. The center of the mark can be displaced a distance in one of four different directions from the nominal position. The value of each symbol can be given by the distance of displacement from the nominal position.

The pen-camera device 12 is also capable of acting as a normal pen or pencil to create handwritten marks 18 on the surface 14. As the pen-camera device moves across the surface 14 to create marks 18, a camera 20 records the position-coding pattern 16 through a window 22, and therefore the path followed by the pen-camera device can be electronically determined. This path information can be downloaded to a computer, which can in turn recognize handwriting, determine where on a form a box was checked, determine where an OMR bubble was marked, and/or any other method of collecting written data.

Components of the pen-camera device 12 include a marking instrument 24, a pressure sensor 26, a processing module 28, and a memory device 32. When the pressure sensor 26 is depressed, it can initiate recording of the pressure of the writing to indicate how light or dark the written lines should be. The processing module can overlay the writing data on a grid coordinate to create virtual or "digital ink". The pen-camera device 12 may include a physical interface 30 for making a physical electrical connection with another interface to allow data to be downloaded from the pen-camera device. The pen-camera device 12 may also include a wireless communication interface 34 for wirelessly downloading data from the pen-camera device. A battery 36 is also present. The components of the pen-camera device are contained within a housing 38, which is configured to be held in a user's hand like a pen.

The surface 14 in FIG. 1 is a paper surface. In other implementations, surfaces only need to be capable of receiving markings in other implementations, such as cardboard, plastic or wood. In some implementations, the surface 14 is flexible like paper. Typical paper forms are 8.5 inches by 11 inches or 210 mm by 297 mm. It will be understood that FIG. 1 is not drawn to scale.

Figure 2:
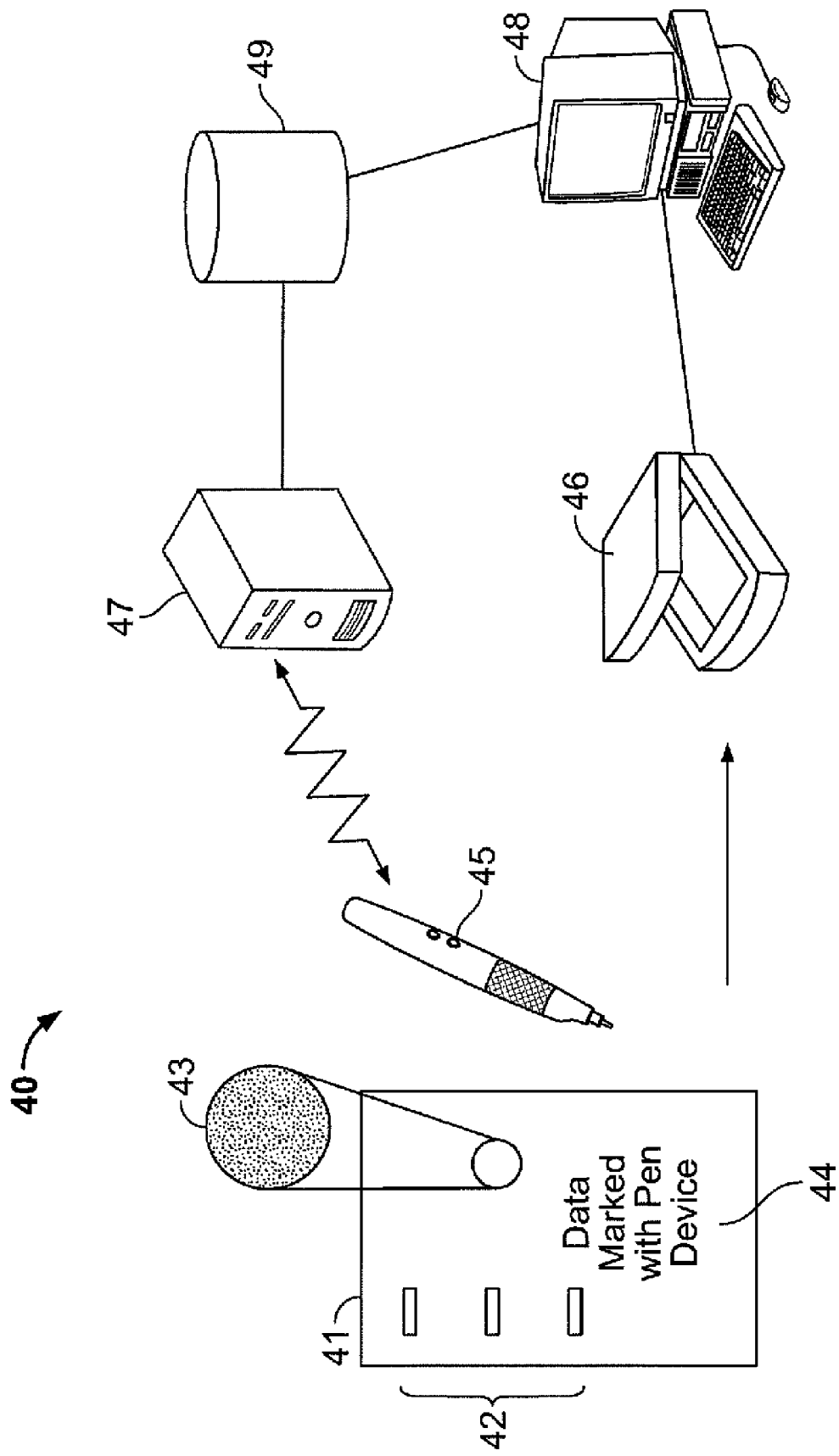
FIG. 2 is an example schematic drawing of a system for collecting data from completed forms.

FIG. 2 is an example schematic drawing of a system for collecting data from completed forms. In particular, FIG. 2 illustrates a system 40 for using a form 41 to gather data electronically. The marked or completed form 41 has location marks 42, a position-coding pattern 43, and data 44 that has been entered by a user of a pen-camera device 45. The system also includes a scanner 46, a control module 47, an optional second control module 48, as well as a database 49 for recorded data.

If a user completes the form 41 using the pen-camera device 45, the pen-camera device 45 determines its path and records that path. As each response field is marked by the user using the pen-camera device 45, the pen-camera device can record a sequence of positions corresponding to a digital record of the entered information. The recorded information can then be processed or stored locally in the pen-camera device 45. Alternatively, the recorded information can be transmitted to a control module 47 for processing or storage. Such processing may require knowledge of a form layout for the form 41, which can be stored in a database 49. The form layout is further described below.

The form 41 includes location marks 42 that have a defined relationship to response fields of the form 41. After the form 41 is completed, either using the pen-camera device or a normal pen or pencil, the form 41 is scanned by the scanner 46. The data file containing the form layout is stored in the database 49 and can be referenced to collect the response data from the scanner 46.

In various implementations, the response data can be collected by scanning alone, by the use of the pen-camera device alone, or by use of both the scanner and pen-camera device. Many alternative hardware configurations can also be implemented, such as the use of a single control module instead of two separate control modules 47, 48.

It is possible to use different types of scanners 46 in the system 40. Certain scanners, for example, can simply generate an image of the completed form, and have software that can analyze the image using the data file and reference marks as positioning tools. Alternately, some scanners can capture select portions of the image, and for other portions of the image, the scanner can capture the actual data, such as "bubble 1=A." In these systems, the scanner can take instructions from the data file to capture the appropriate information.

Aspects of this disclosure also disclose the creation and use of the data file used to interpret the data on the scannable form. The process of creating a form for electronic data capture by a scanner will now be described.

FIG. 3 is an example form for collecting data for a census, where the form layout includes open-ended questions and multiple choice questions. The form reflects a form layout, which is an arrangement of text and graphics that defines response queries and response fields. Other aspects may also be included on a form layout, such as instructions and information identifying the form.

The form 50 is a scannable form, including a surface 52 and location marks 54. In the implementation of FIG. 3, the surface 52 is a generally a rectangular paper sheet, though other surfaces are possible in alternative implementations, such as cardboard, wood, plastic, etc. The location marks 54 can provide a clear, scannable feature that a scanner or a computer can use to identify a referenceable physical location on the surface. In FIG. 3, the location marks 54 can also be referred to as a timing track 54, and can be a row of uniformly spaced timing marks 56 located along one edge 58 of the sheet 50. Other types of location marks can be used instead of timing marks, as will be further described herein. Typically, timing marks are located within one-half inch of the edge of the sheet of paper.

In some implementations, the form includes a bar code area 60, where one or more bar codes identifying the form may be placed. In some implementations, there is no position-coding pattern in the bar code area 60.

Also included on the scannable form 50 are areas for customized questions or queries, such as question 70 and question 72, the corresponding response areas, such as response areas 74 and 76, text areas 78, and graphics 80. Text box response area 82 is a rectangle where one letter is written by the user, facilitating optical character recognition from this area 82. An open-ended response area 74 can allow a user to add text to the area 74. A multiple-choice response area 76 can allow a user of the form to select from pre-defined choices, either by placing a mark in a box, shading an oval, or other indications.

In addition, FIG. 3 includes a position-coding pattern 16, which is shown in an exploded view. In some implementations, the position-coding pattern is present over most of the surface of the form 50. In other implementations, the position coding pattern is only present in select areas of the form. For example, in some implementations, the position-coding pattern is only present within or between all or some of the response fields, or in all or some of the open-ended response fields.

Figure 4:
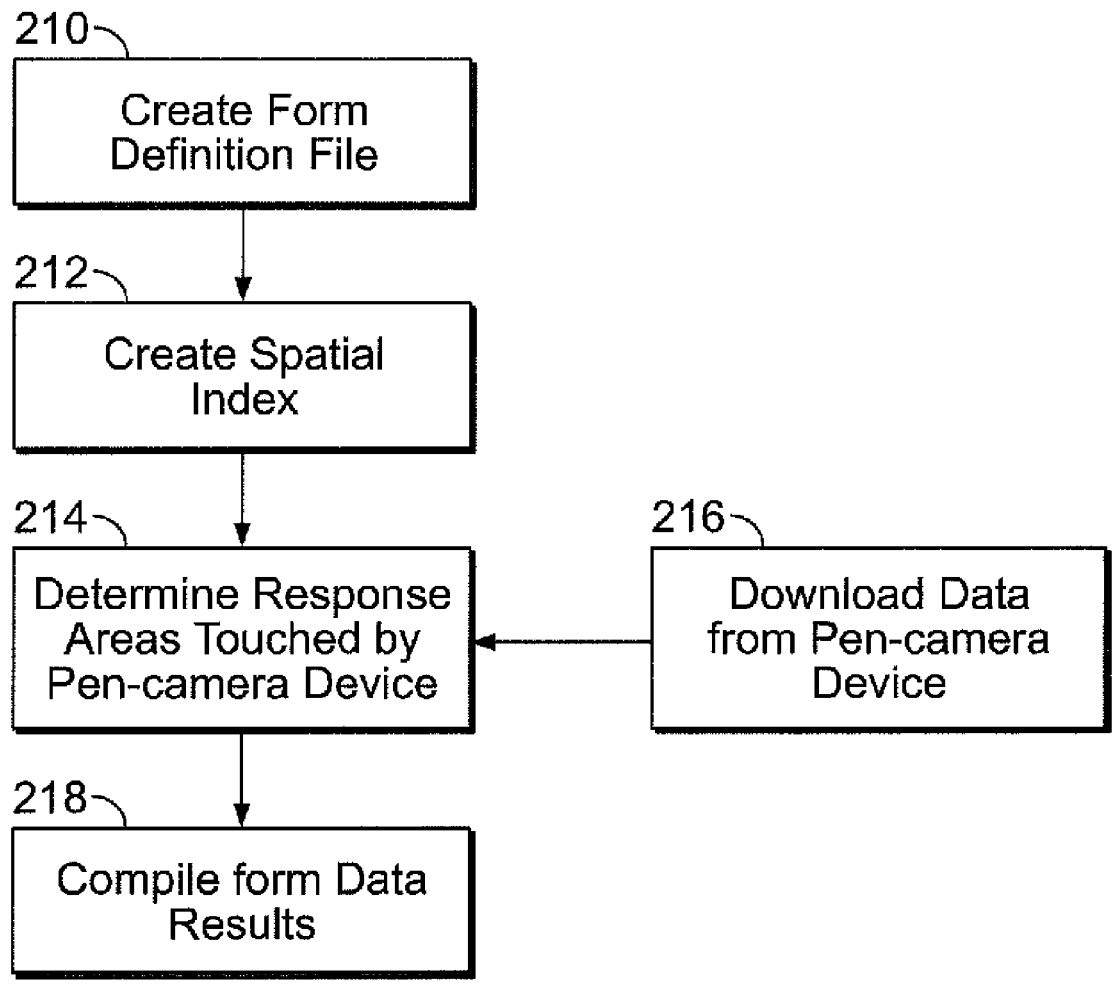
FIG. 4 is an example flowchart for determining results from the completion of a form using the pen-camera device.

FIG. 4 is an example flowchart for determining results from the completion of a form using a pen-camera device. In particular, the process of obtaining results from using the pen-camera device and the scanner is illustrated. Initially, a form definition file is created for a specific form (210). Then, a spatial index is created (212), which translates a virtual coordinate system used by the scanning software to a position format that is known to the digital pen software.

Generally, a spatial index is used by spatial databases to optimize the arrangement and retrieval of spatial information. Some spatial index methods include a grid, a quadtree, an octree, a UB-tree, and an R-tree, and can be used in conjunction with one or more implementations in this disclosure.

While a form is being completed by a user with a pen-camera device, the pen can provide a vector of floating point values that can correspond to a location on the page where the pen stroke occurred. This vector can be converted into a geometry that has a width that closely approximates the actual width of the ink. This information is downloaded from the pen-camera device (216). Next, the spatial index can be queried to see if any of the pen strokes intersect or are inside of the geometries of any response fields.

For closed response queries, the presence of a pen stroke within a particular bubble or check box can provide that sought after data without any further analysis. For example, if a pen stroke is observed in response area 130, or "bubble 1", of FIG. 3, then the results can state that the house is a one-family house detached from any other house.

For open ended response queries, such as response area 82 in FIG. 3, an image of the stroke(s) that falls within the boundaries of response area 82 can be captured. The image of the stroke is associated with the response query for further later processing, such as using handwriting recognition applications.

In step 218, the results are compiled. For each response area for each form processed, the results can show the response indicated by the user of the form. These results can be provided in the form of a chart, graph, or text. If the response field is an open ended response field and handwriting analysis was performed, the image of the response stroke or strokes can be presented side by side with the interpreted data in certain implementations.

In one implementation, the image of the response stroke or strokes that is presented in the results is not limited to the boundaries of the response area for open-ended responses. Instead, the whole stroke can be captured. A "stroke" can be intended to mean the combination of (x,y) coordinates that represent a mark made on the paper from the point when the pen is pressed on the paper until it is released. If one or more strokes touch or intersect a response area, that stroke or strokes can be presented next to the corresponding text obtained from the handwriting analysis in the results. In some cases, a single stroke can touch or intersect multiple open-ended response fields. In some implementations, this type of stroke can be reported only for the response area that is closest to the center of the stroke.

There can be many different formats available for presenting results to those individuals administering the form. In some implementations, a web-based interface can allow an administrator to review the compiled results from each form. In one implementation of the results report, an image or a hyperlink to the image of the response area that was interpreted can appear next to the interpreted data.

Figure 5:
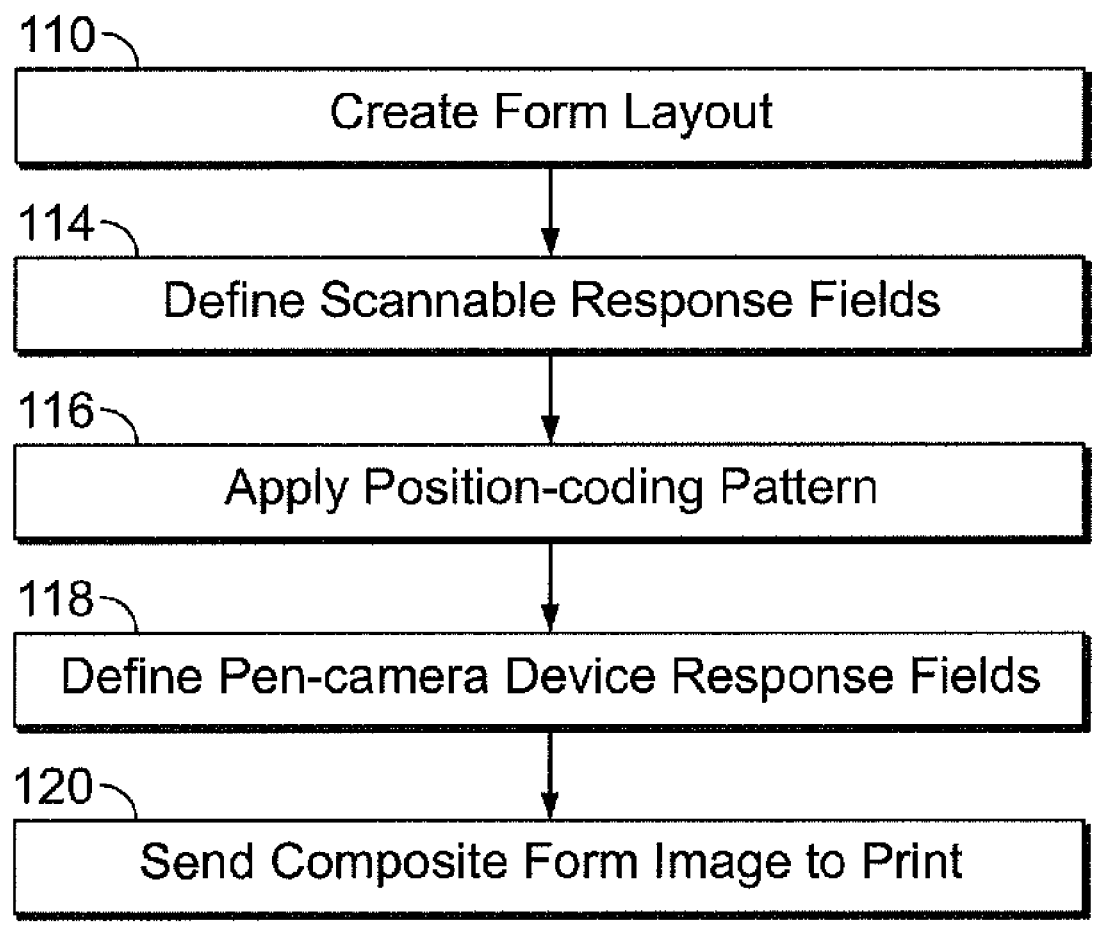
FIG. 5 is an example flowchart for creating a form for collecting responses.

FIG. 5 is an example flowchart for creating a form for collecting responses. A form layout is constructed (110), where the form layout includes the various text and graphics to achieve a certain appearance and to provide certain response queries to the user, such as response query 72 from FIG. 3, which states "In which year was this dwelling built?"

After all of the text, graphics, and response queries have been created or added to the form layout, and positioned, the scannable response fields are defined (114). This step can be often referred to as an application definition, and can involve entering a number of important pieces of data related to each response field in a data file that is associated with the form. To enable collection of data from a form after it has been completed, the data file is built for each form. For each response field, the data file can define the response field's dimensions and location on a virtual coordinate system. The location and dimensions can be described in horizontal and vertical coordinates in the data file. In addition, the value, meaning or expected content of each response field can be contained in the data file. For example, if the response field is bubble field 130 on FIG. 3, which may be referred to as "bubble one," then the definition of bubble one can be "A one-family house detached from any other house" for the answer to question three. Alternatively, the values of a particular bubble field can be a letter, such as "A" or "H", or other specific content for a given query, depending on how the response query and desired response are structured.

For open-ended response fields, such as response field 132 in FIG. 3, the data file can have information to tell the scanner or software to capture an image of any written data. Typically, a rectangular-shaped field is defined for open-ended response areas, such as response area 132. In some implementations, the form definition file indicates that the scanner, associated software, and/or a pen-camera device should be used to perform character recognition on the marks within the field.

The process of defining the scannable response fields can also include the process of defining any rules associated with particular response fields or groups of response fields. One example of a rule is a requirement that only one of many choices be marked within a group of response areas. The rule definition can define how the scanner and/or software should behave if more than one bubble is marked corresponding to one of the digits of the identification (ID) number, or other specific circumstances. In some implementations, a scannable response is built and a form definition file is created using NCS Design Expert software, available from Pearson NCS, Eagan, Minn., or Scantron Corporation of Irvine, Calif.

The position-coding pattern to the form layout is then applied (116). The relationship of the position-coding pattern to the location marks can be defined with respect to the virtual coordinate system.

After the scannable response fields are defined and the position-coding pattern is applied, the pen-camera response fields are defined (118). Alternatively, the steps of defining the scannable response fields and the pen-camera response fields can occur simultaneously using an application configured to accomplish both definitions. The virtual coordinate system of the data file can be again used to define the location and dimensions of each of the response fields in relation to the position-coding pattern 16. In addition, the expected content, meaning or value for each of the response fields is defined, along with any rules. The final step in the process of FIG. 5 is printing the form (120). This step is illustrated in FIG. 6.

Figure 6:
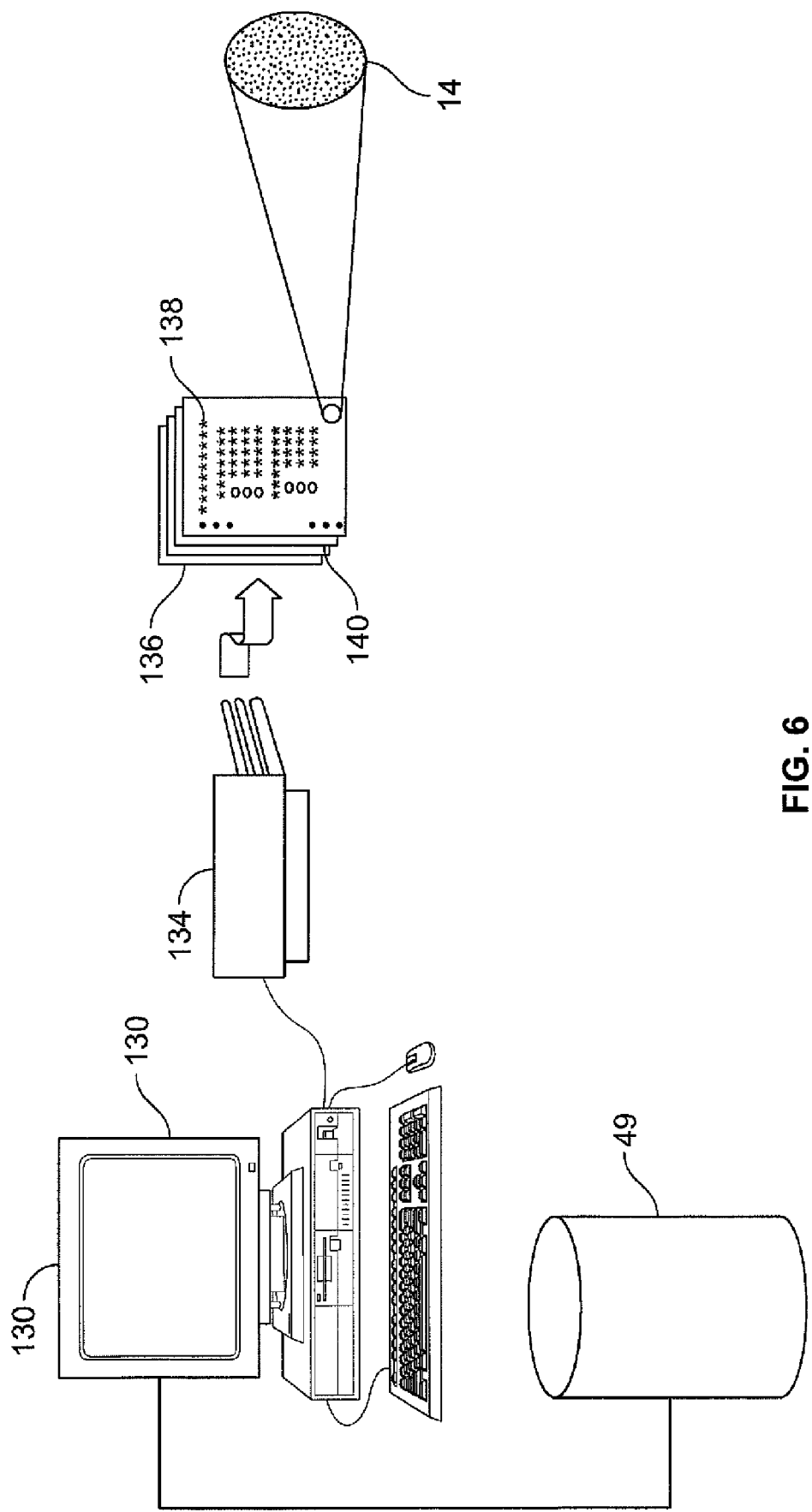
FIG. 6 is an example system for creating forms.

FIG. 6 is an example system for creating forms. In particular, the system of FIG. 6 includes a control module 130 operatively connected to a database 49 where the form layout is stored, and a printer 134 that prints forms 136 having a form image 138, location marks 140, and a position coding pattern 16. The control module 130 can be a computer terminal, server, or other processing component. The form layout can be sent to print at many different types of printers. A printing plant is used in one implementation.

The marking implement used to complete the form also preferably marks with a marking that is above the threshold for recognition of the mark. Bubbles or ovals that are filled in can be detected using a trans-optic method of scanning (light transmitted through the form) or by a reflective-read method of scanning (light reflected from the surface of the form), and by observing a mark above a certain level of gray-scale intensity in the response field. In some implementations, the position-coding pattern can be printed and/or the scanner can be configured so that the position-coding pattern is below the threshold of detection for the scanner. As a result, the position-coding pattern will not interfere with the capture of information in the response fields. In some implementations, the pen-camera device can use Ink Red dropout for form markings.

Location marks (e.g., location mark 54 in FIG. 3) can be printed that are above a threshold for recognition so that they are detected by the scanner. It should be appreciated that, at a basic level, the location marks 54 can be used during the process of scanning the completed forms to properly "orient" the marked form onto the coordinate system of the virtual form, thereby inferring the nominal locations of all the response fields in the completed form based on the data file associated with the form.

The timing marks (e.g., timing marks 36 in FIG. 3) are used to trigger an optical mark recognition (OMR) system to scan or "read" the response area to detect whether a data mark is present at a particular response area. In particular, the timing tracks on scannable forms for such scanners are to be printed to high standards of print quality and print alignment to insure that an acceptably high percentage of completed forms can later be properly scanned and scored. Certain OMR scanners use the timing marks in the timing track to trigger when to scan the corresponding row of response areas in the response area.

In some implementations, to insure that the response areas will be consistently and correctly scanned by the OMR scanner, the computer can only allow the user to position the response areas about a series of predetermined locations or dots that make up the virtual coordinate system or grid pattern that is aligned in a specified relation with the timing marks on the scannable form.

As an alternative to timing tracks, certain implementations can utilize reference marks instead of timing tracks. Reference marks can be positioned at known locations and spatial relationships, but not necessarily just along an edge of the form surface, though they may be near an edge. A form includes multiple, typically four, reference marks at the corners, for example. Two, three, or more reference marks can also be used, either in the corners or at locations other than the corners of the form. The reference marks can be relatively accurately positioned on the form so that the coordinates of the reference marks on both the forms and in the virtual coordinate system are established with a high degree of accuracy. To the extent the coordinates of the reference marks in the completed form file differ from the coordinates of the reference marks of the form layout in the virtual coordinate system, adjustment can be made for the deviations arising from skew, shift, stretch (scale), and slant, such that the coordinates associated with each response area on the completed form file can be appropriately offset or adjusted relative to the coordinates of the master template form in the virtual coordinate system. In this manner, marks made by the subject on the form, can be better associated with a response field location.

Aspects of the form layout, such as the text of response queries and the outlines of response fields (such as bubble fields) can be eliminated from the scanned image of the response field by scanning via using drop out filters so that no outline or image of a bubble field or the like will be represented in the marked form file. The position-coding pattern also can be eliminated from the image of the marked or completed form using drop out filters.

Different methods for gathering data will now be described in view of a comparison of the pen-camera device results with the scanner results. After the response information has been gathered via the pen-camera device, a determination can be made about whether or not the response information should be collected using a scanner. In some situations, the paper copies of the completed response forms can be simply stored for possible later scanning and processing. In some implementations, the step of scanning the paper copies of the completed responses will be undertaken so that an image of the marked forms is preserved. The underlying paper document itself may or may not be preserved, in different implementations. In some implementations, all of the steps of collecting and analyzing data using the scanner can be undertaken immediately.

Figure 7:
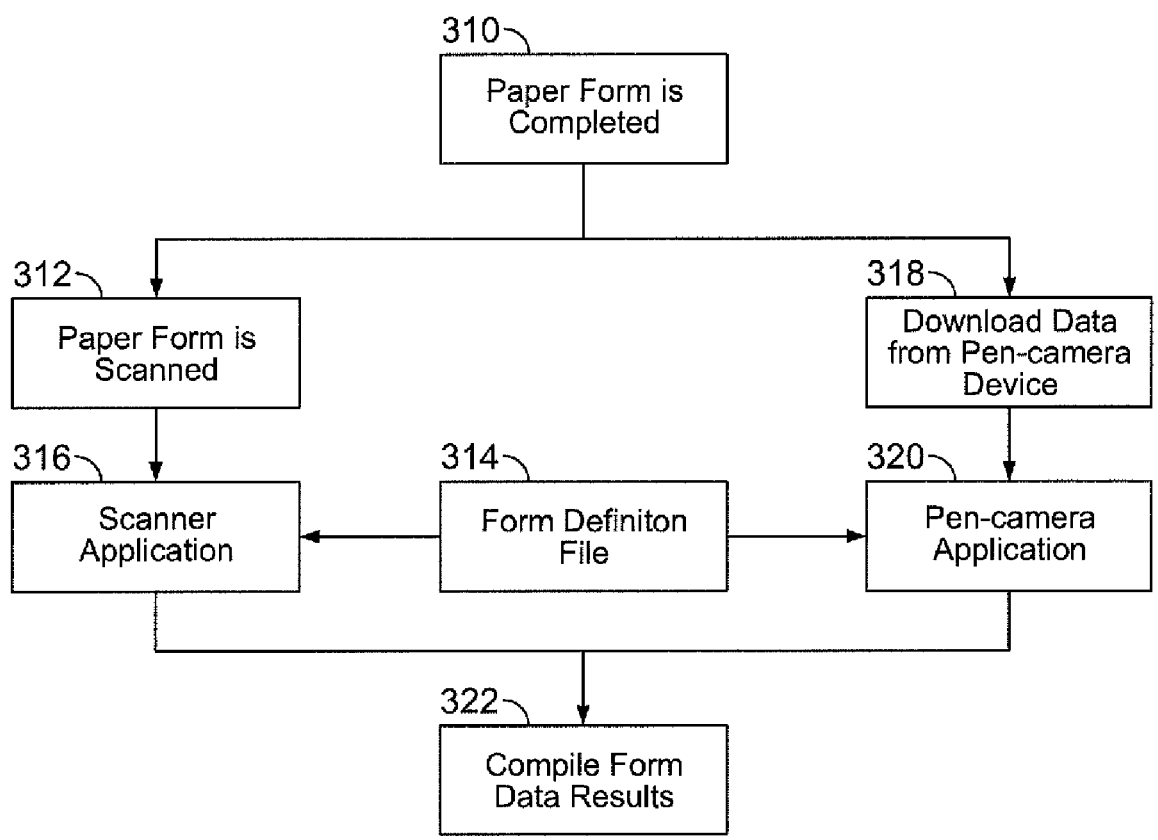
FIG. 7 is an example flowchart for gathering information using two electronic techniques that both reference a form definition file for the form.

FIG. 7 is an example flowchart for gathering information using two electronic methods that both reference a form definition file for the form. In particular, FIG. 7 illustrates how the two methods of data collection occur and reference the same form definition file. After a paper form is answered/filled-in and completed (310) using a pen-camera device, the paper form is scanned (312). The scanner application obtains data results from the scanned paper form (316), and references the form definition file (314) when obtaining those data results. The data from the pen-camera device is downloaded (318), and the pen-camera application operates (320) with reference to the form definition file (314). Data results from both methods are then compiled (322).

In various implementations, the step of compiling the form data results can include comparing the results obtained by both methods and flagging any discrepancies for review by an evaluator. In this aspect, the compilation of the data for the two combined methods can be used for data error checking and correction.

Other aspects of this disclosure provide a method of providing flexible data collection. In some implementations, one method of collecting data is sufficient, but there can be flexibility in how that data is gathered. For example, when a school is administering a test, one room may desire to use the pen-camera devices to mark the forms and gather the data, while another room simply marks the paper with a pen or pencil and uses a scanner to collect the data. According to the some aspects of the disclosure, a single form is used having a single data file, but different methods of data collection are employed.

Figure 8:
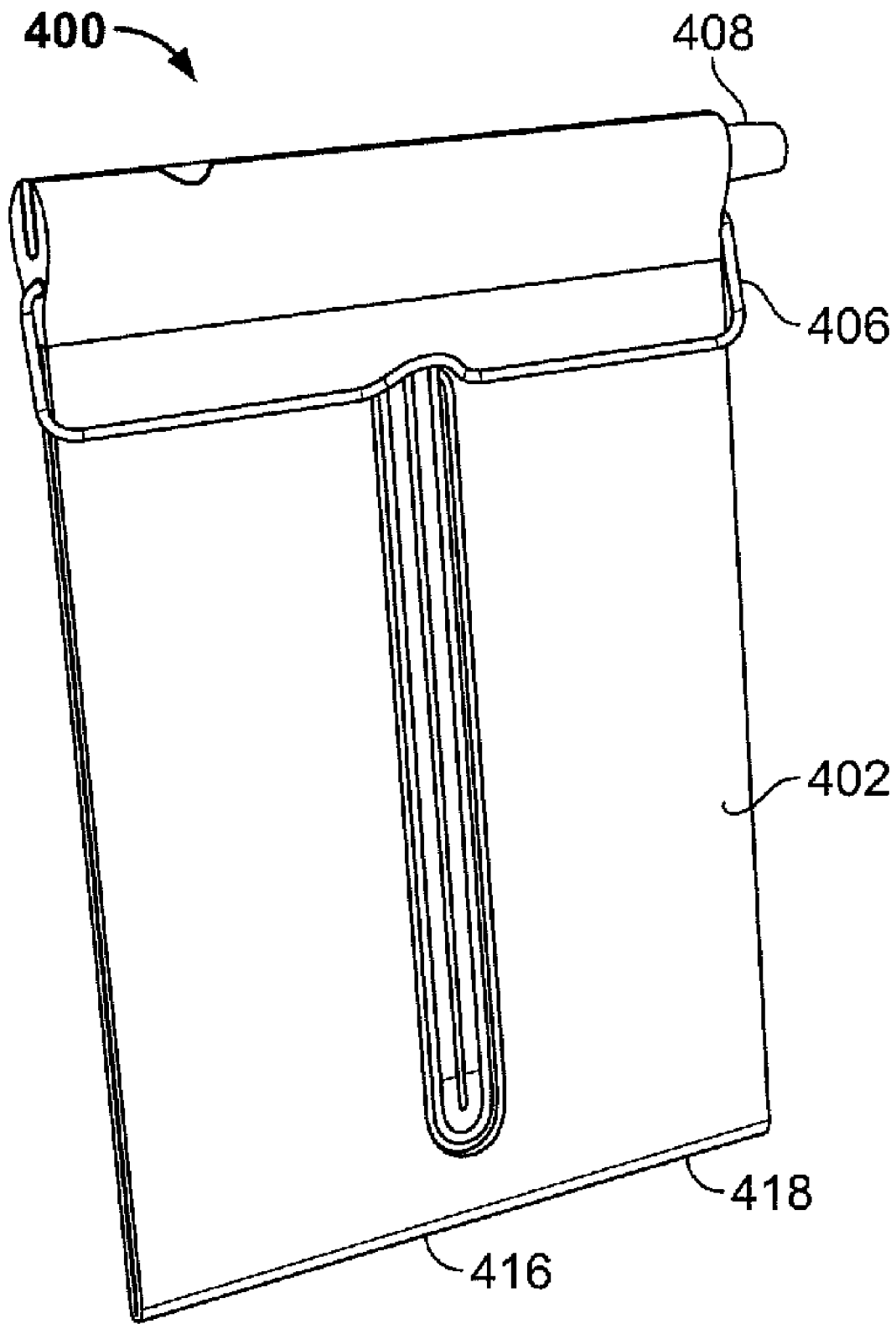
FIGS. 8-9 show example views of an electronic clipboard with a pen-camera device.
Figure 9:
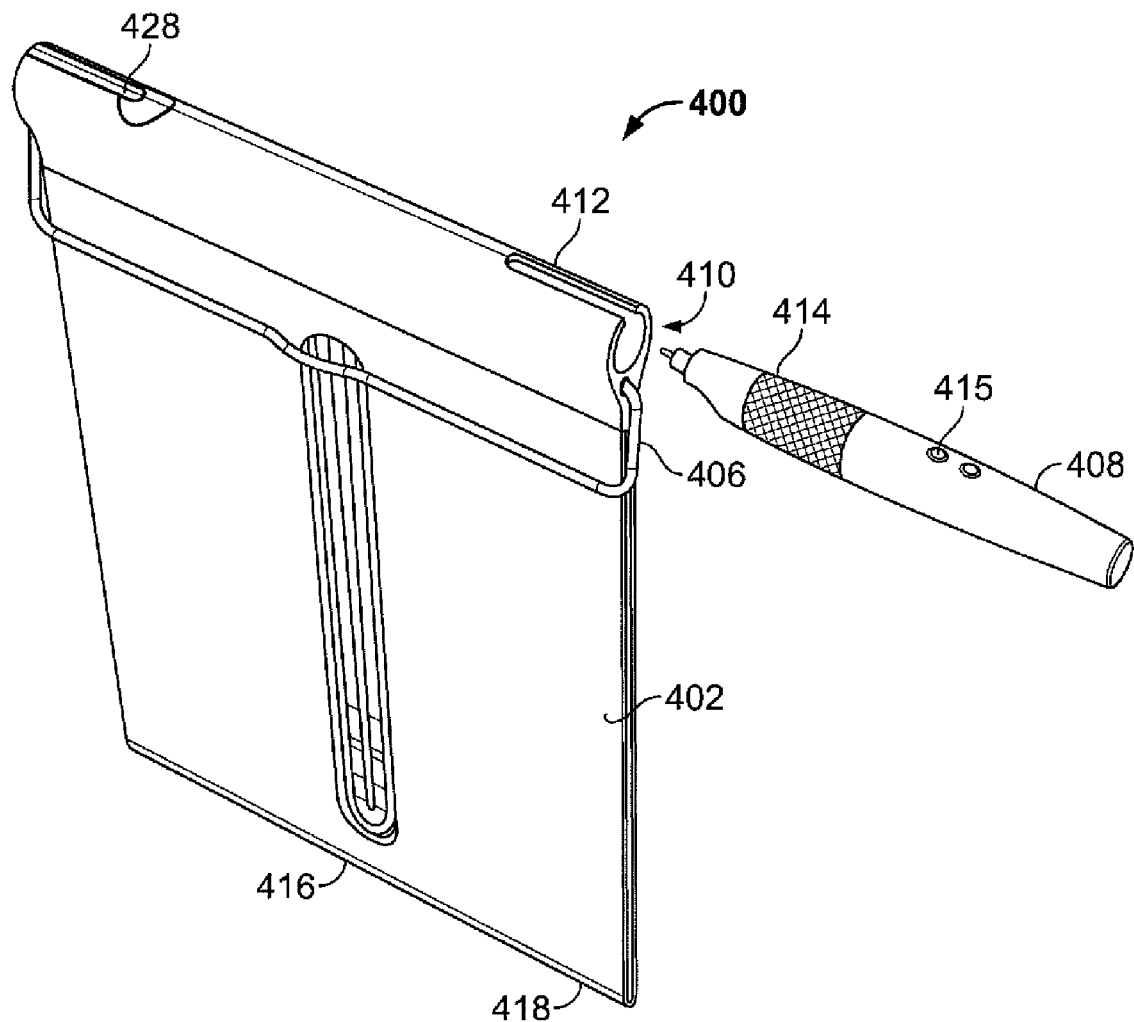

Pen-Camera Device with Electronic Clipboard, and Docking Station for the Electronic Clipboard FIGS. 8-9 show example views of an electronic clipboard with a pen-camera device. When completing a paper form, it is often convenient to have a rigid, planar surface, such as a clipboard, for supporting the paper form. In some implementations, a number of helpful features are integrated into a clipboard device 400, as shown in FIGS. 8-11. These features can facilitate the workflow process that is often associated with a paper form, in various implementations.

Now referring to FIG. 8, clipboard 400 is configured to hold a paper form in a stable position on a substantially planar surface 402 using a retention clip 406. The clipboard is also configured to hold the pen-camera device 408 within a pen compartment 410. In some implementations, the clipboard 400 also includes an internal forms compartment for storing copies of the paper form, such as unused and completed forms.

The clipboard 400 is configured to facilitate the process of downloading data from the pen-camera device. The pen-camera device has a physical interface 414 for making a physical electrical connection with another interface to allow data to be downloaded from the pen-camera device, and for recharging the batteries within the pen-camera device. Such an interface can be provided within the pen compartment 410 to mate with the interface 414 of the pen-camera device. In some implementations, the pen-camera device can have a wireless communication interface or unit to transmit location and/or response data. A window or opening 412 can be provided in the wall of the pen compartment 410 in order to allow a view of any LED indicators 415 indicating states such as battery status, storage capacity status, or downloading status on the pen-camera device 408.

The clipboard 400 includes another interface structure 416 ("clipboard external interface") along one of its edges, such as along bottom edge 418, which is electrically connected to the internal interface of the pen compartment 410. The clipboard external interface 416 is configured to mate with a docking station interface within a clipboard docking station 422.

Figure 10:
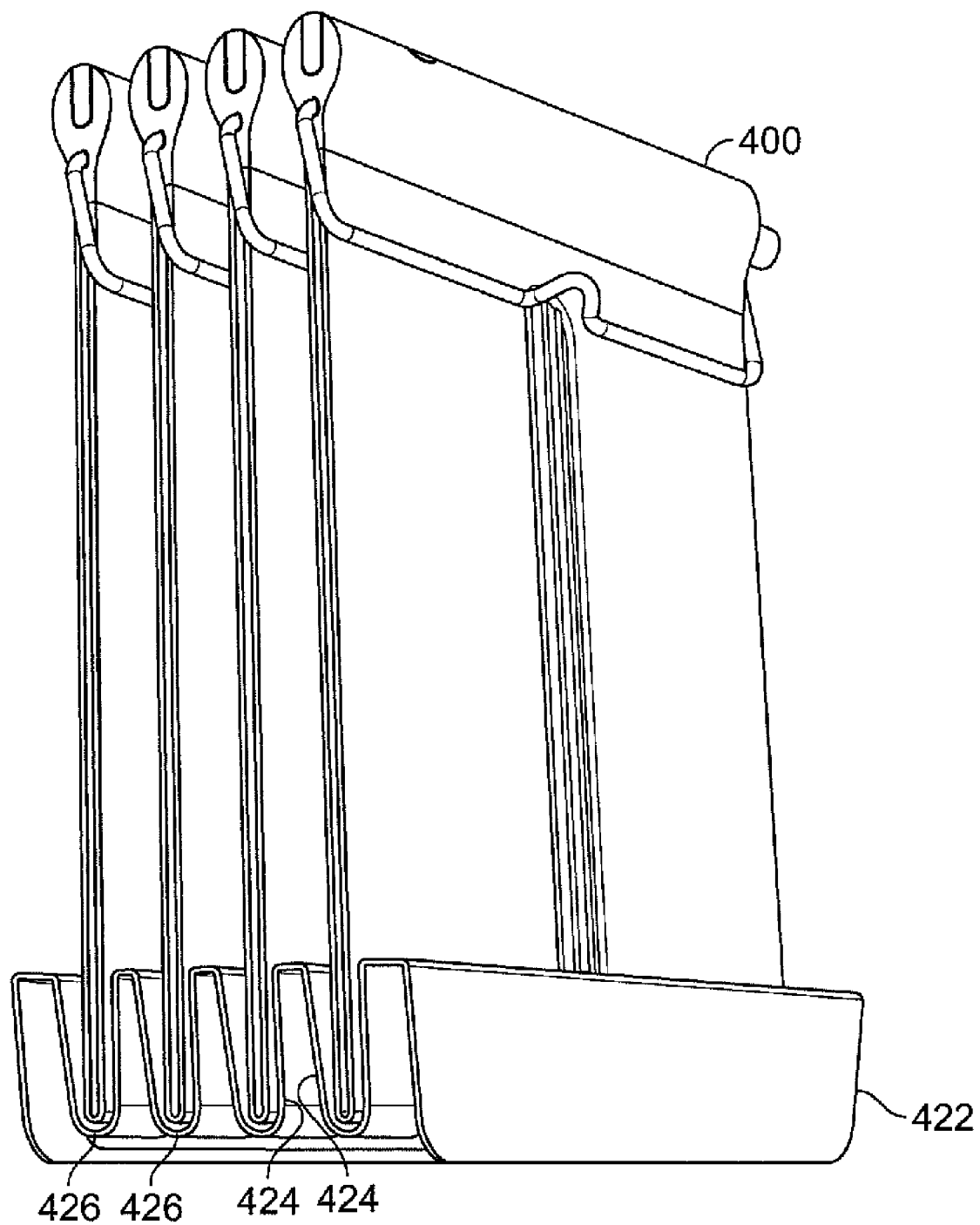
FIGS. 10-11 show example views of a pen-camera clipboard docking station and a clipboard with a pen-camera device.
Figure 11:
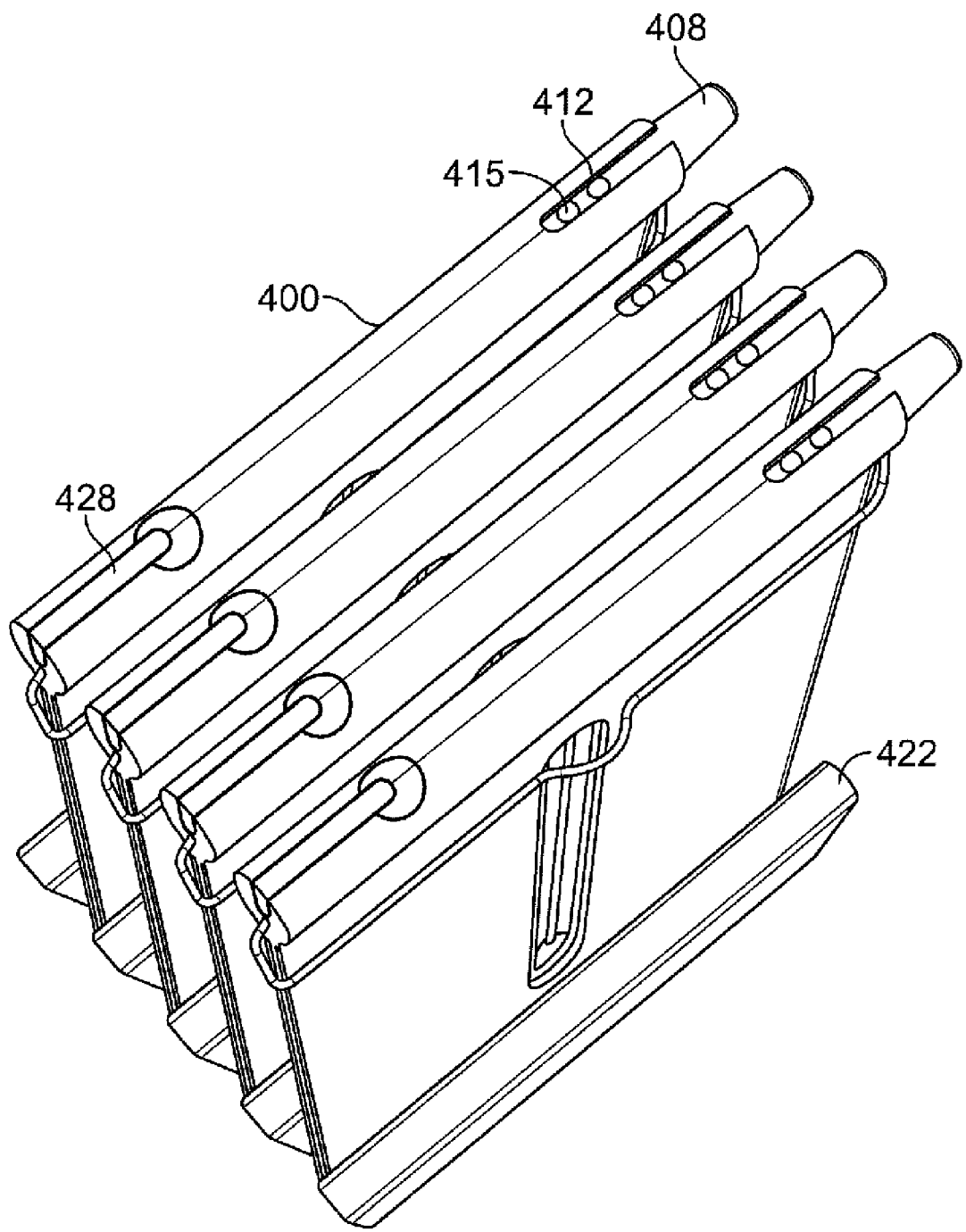
Figure 12:
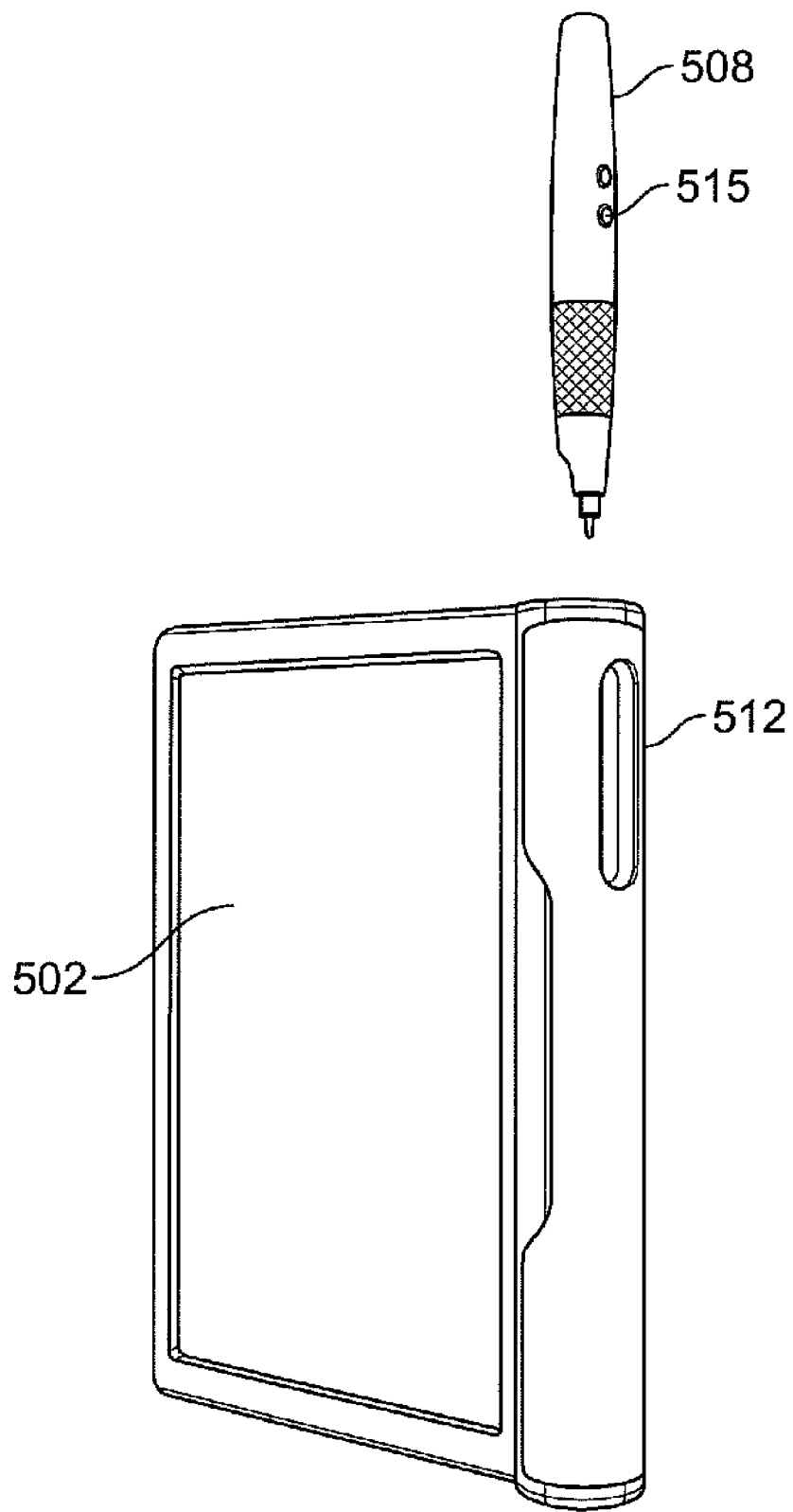
FIGS. 12-15 show example views of an alternative electronic clipboard with a pen-camera device.
Figure 13:
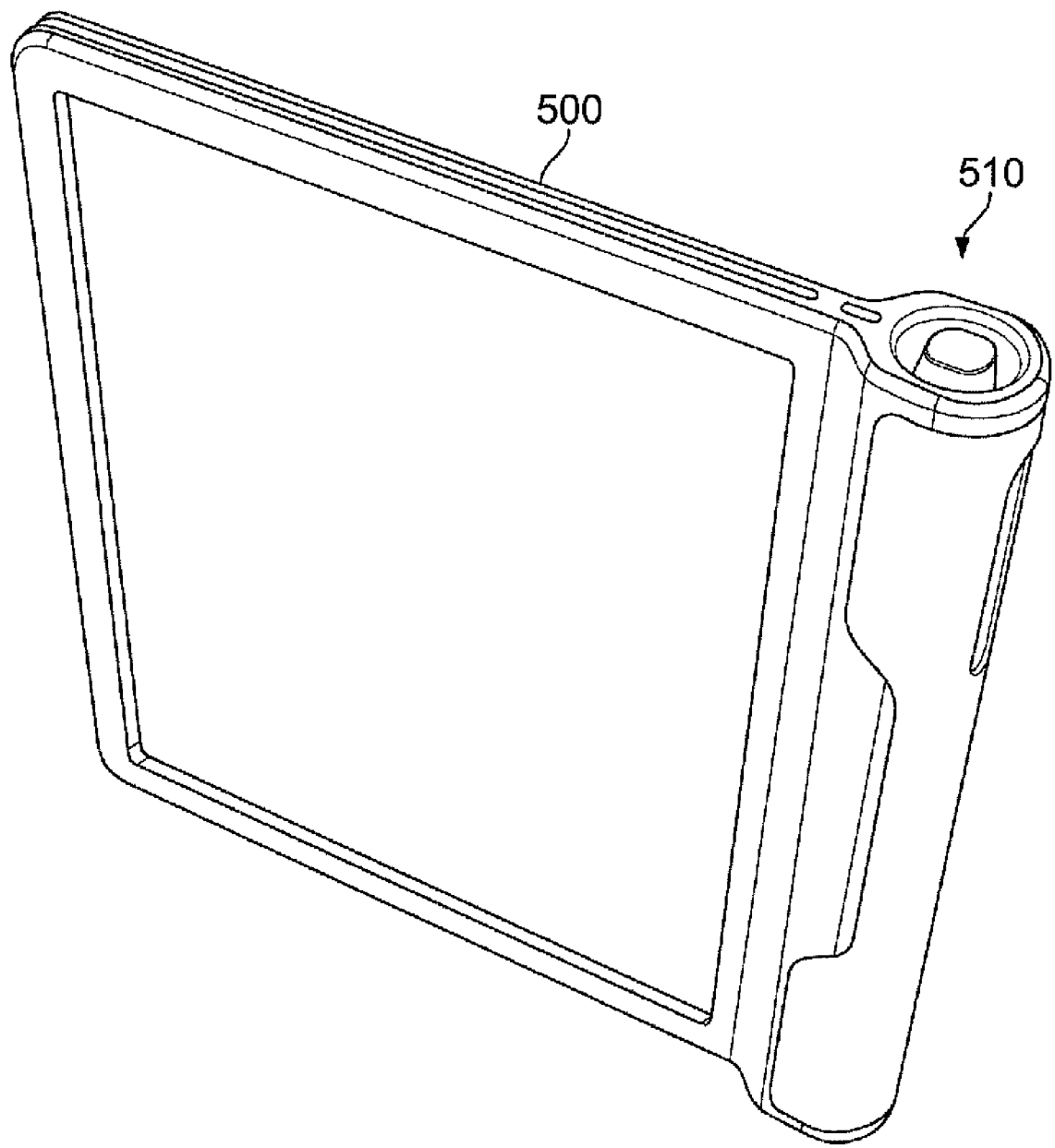
Figure 14:
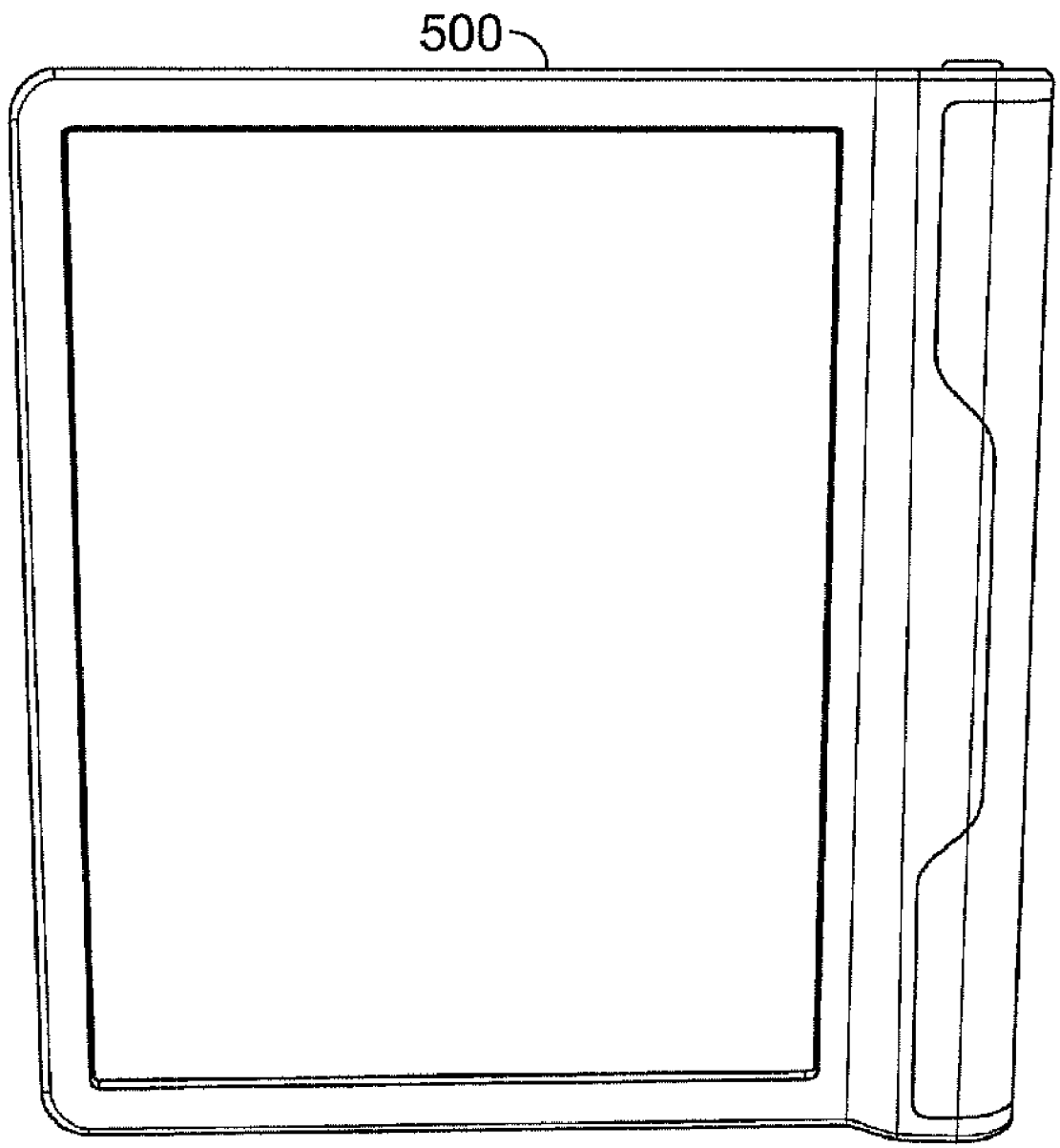
Figure 15:
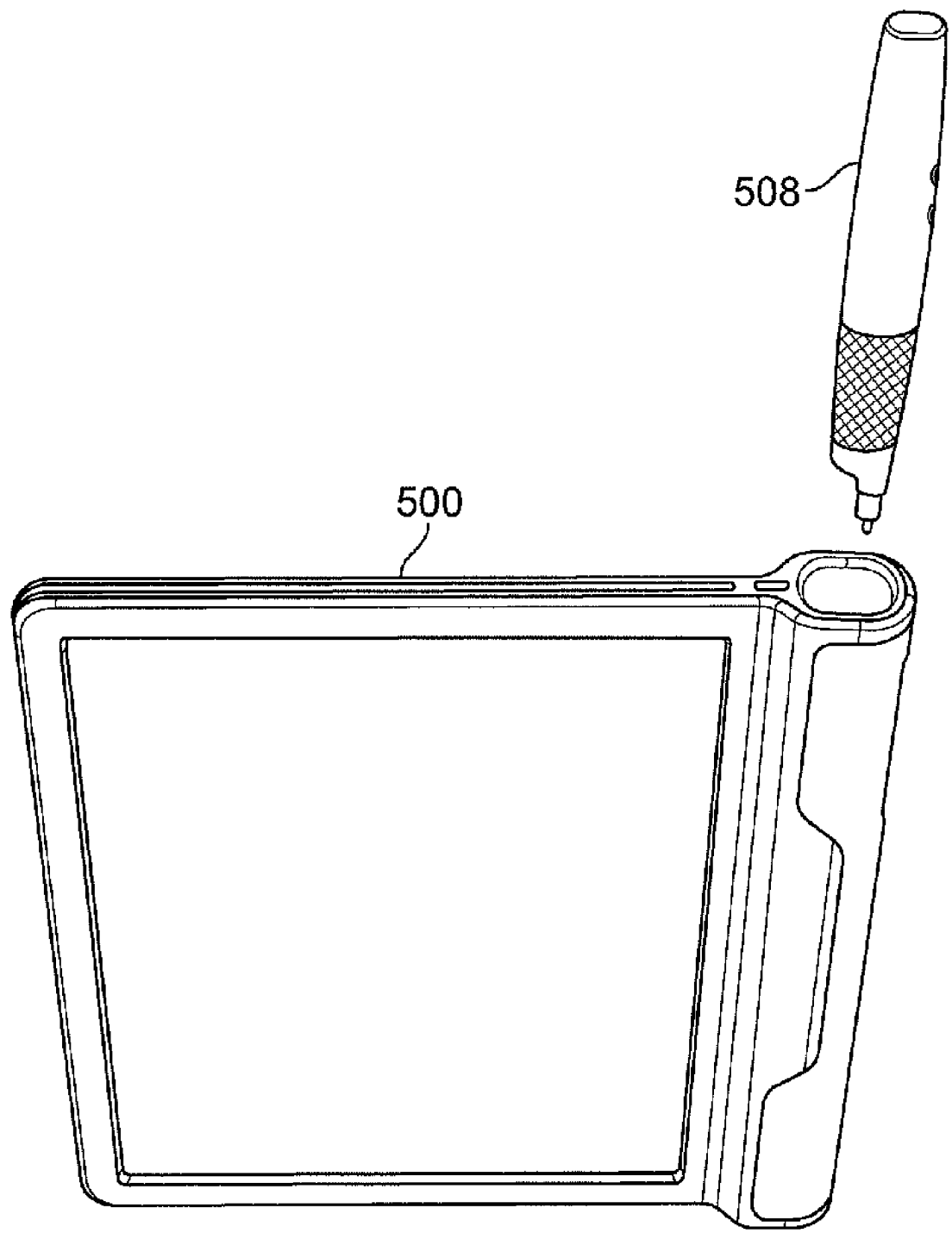

FIGS. 10-11 show example views of a docking station 422 and clipboard 400 with a pen-camera device 408. The docking station 422 defines channels 424 for supporting the clipboard so that the clipboard bottom edge 418 rests against the bottom of the channels 424. At the contact between the clipboard bottom edge 418 and the bottom 426 of the channels 424, an electrical interface is established so that the docking station 422 is configured to download data from a pen-camera device 408 that is stored within the pen compartment 410 of the clipboard. The docking station 422 is connected, preferably via a USB cable, though other connections are possible, to a computer or processing module. In some implementations, the docking station can be powered from a USB connected. In some implementations, the docking station can have a wireless communication interface or unit to transmit location and/or response data. The docking station 422 downloads data from the pen-camera device. The docking station 422 also charges the pen-camera device 408, in some implementations, when the corresponding clipboard 400 is docked.

In the implementation shown, the docking station 422 is capable of holding four clipboards, and being positioned on a desktop of other planar surface. In other implementations, the docking station is configured for holding different numbers of clipboards, such as, for example, eight, six, two or one. In implementations where more than one clipboard may be docked and more than one pen may be charged, the docking station 422 is provided with a power source connection. Also in other implementations, the docking station is configured to be mounted on a wall instead of resting on a surface. In one specific alternative implementation, for example, the docking station holds one clipboard, is wall mounted, includes a USB connection to a computer, and includes an integrated power source connection. The docking station can simultaneously charge and supply power to multiple clipboards.

In some implementations, the docking station can hold a removable memory card to store a record of pen-camera data on the card. When verifying census data, for example, the memory card can be removed and the data from the memory card can be compared with written responses on the form, or with scanned data of those written responses.

In some implementations, the clipboard includes a battery charging system so that when the pen-camera device is stored in the pen compartment, the clipboard recharges the pen-camera device right from the clipboard with no external power. This implementation can be very appealing to people using a digital pen to gather census information, especially in more remote areas or rural locations where a census taker may be in the field for several days in areas that do not have a power for recharging the system. In some implementations, an LED indicator is provided, indicating the level of charge in the clipboard batteries (e.g. green, yellow, or red). In some implementations, a status of the data transmission or the battery charging can be shown in an LCD monitor on the clipboard and/or docking station.

The pen compartment 410 can be configured to mechanically retain the pen-camera device. In some implementations, a flexible structure can be provided within the pen compartment within some implementations to allow the pen compartment to accept pens of different form factors and shapes. The flexible structure can be either permanently positioned in the pen compartment or can be a removable insert. The pen compartment can be configured to be as flush as possible to the remainder of the clipboard outline in order to minimize the damage during use or when transported.

FIGS. 12-15 show example views of an alternative clipboard with a pen-camera device. In particular, FIGS. 12-15 show an alternate implementation of a clipboard 500 that includes a planar surface 502, a pen-camera device 508, and a pen compartment 510. A window or opening 512 can be provided in the wall of the pen compartment 510 in order to allow a view of any indicators 515 (e.g., LED indicators) indicating states such as battery status, storage capacity status, or downloading status on the pen-camera device 508. The clipboard 500 is also configured for mating with a docking station and downloading data from the pen-camera device 508, as discussed above with respect to clipboard 400.

The clipboards can be especially useful in census, voting, and testing applications. In addition, a medical office is well-suited for use of the clipboards of this type. In one implementation of a method of using the clipboards, patients are given clipboards with pen-camera device positioned in the pen compartment. Patients complete their intake forms, and then the digital pen is returned to the pen compartment, and the clipboard is returned to the docking station.

The docking station provides a convenient way to download data from the pen. This can also allow that office assistant to work on other matters instead of manually entering data into a system from a paper form.

Pattern Identification Techniques on Scannable Forms

Figure 16:
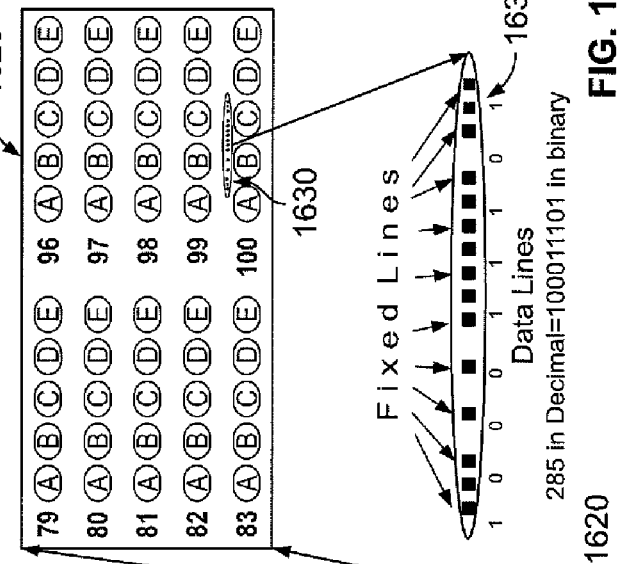
FIG. 16 shows example views of a scannable form with pattern identification encoded on the form.

FIG. 16 shows example views of a scannable form with pattern identification encoded on the form. In particular, information on the form can indicate a type of position-coding pattern that is used for a particular form. As shown in the expanded view of the position-coding pattern 16 in the example forms of FIGS. 1 and 3, the form can have millions of small, unique patterns that are detectable by a scanner, and those the millions of unique patterns may be invisible to the human eye. By using a set of very narrow and thin lines and spaces in the form in a binary encoding technique, information to identify characteristics of the form could be encoded in a very small space on the form. In particular, the binary encoding can reveal information to identify a type of form to software interpreting scanned, binary-encoded information for the form. Furthermore, the binary encoding can inform the software how to gather the "ink" or the written data on the form. As described above, the "ink" can also have information to reveal an emphasis of the data on the form, such as writing lightly or boldly in traditional handwriting.

FIG. 16 shows an example scannable form 1610, where one section 1620 of the form 1610 includes binary encoded information 1630. In the example show, the code of "1000111001" for the binary encoded information 1630 represents 285 in (base 10) Decimal. Software reading the binary encoded information on the form could recognize that 285 could represent a particular type of form. In some implementations, the binary encoded information is an identifier for a form stored in a system memory. Once the type of form is known, the software can have information to recognize exactly how the position-coding pattern is arranged on the form. In some implementations, the encoded information itself can represent information to disclose how the position-coding pattern is arranged on the form and/or where the position-coding pattern is located on the form.

In some implementations, each line and space would only need to be two pixels wide in either the horizontal or vertical directions at the resolution of the form image. By using a 200 dots-per-inch (DPI) image, for example, each line and space for the binary encoded information 1630 would only be 0.010". One method of accurately encoding this information would be to have fixed (i.e., permanent) lines present, where each of the fixed lines are separated by a blank line (i.e., a space). The binary information can be added by adding lines within the various spaces to indicate a type of position-coding pattern for the form.

Alternatively, the amount of information encoded could be variable based on the number of fixed lines. In some situations this might be required because the number of reusable patterns may increase over time, and the range of unique patterns would require considerably more information. The example shown in FIG. 16 can have data lines to indicate a digital representation of 0-511 types of forms and/or types of position-coding patterns.

Data Correction Techniques for a Scannable Form

When filling out a form using the pen-camera device, the user usually has to do some type of action to indicate that a new form is being filled out and the data from a previous form has been completed. For example, this action could be done by docking the pen, scanning a barcode with the pen, or writing on a specific area of the form. In some implementations, a pen-camera device has a button or switch that a user should use to indicate that a new form has been started or that a form has been completed.

Three of the most common errors with the pen-camera data collection can include: (1) the user either failing to properly indicate that a new form is being filled out, thus causing data from multiple forms to be combined on a single form image; (2) the user inadvertently indicating that a new form is being filled out, thus causing the data from a single form image to be spread across two form images; and (3) the user partially filling out one form and then filling out another form before returning to the original form. This third situation can cause the data from the first form to be split amongst two form images, or further separated by one or more additional form images. The first two scenarios may be mistakes made by the user. However, the third scenario may be caused by the data source for the form (e.g., when a student takes a test) becoming unavailable for a period, during which other data must be gathered (e.g., when other students are to be tested). In order to resolve these issues, a set of user-tunable rules using time-stamped information, which is saved with each ink stroke made with the pen-camera device, can be added to software associated with the pen-camera device.

FIGS. 17A-17G show example views of data changes on form images in time various periods. In particular FIGS. 17A-17G show various diagrams of techniques to handle situations where a form may have data that is overwritten in two separate writing sessions, or situations to ensure that data in a form is completed before new data is added. In some implementations herein, software can provide a convenient graphical user interface (GUI) for concurrently displaying multiple images of the form, with the multiple images representing various states (or snapshots) of the form at different times.

The software can employ the pen-camera data in checking for at least four situations of where there was not a notice or indication of a new form when the user started the new form, and at least three situations of when there was an incorrect notice or indication that a new form was started, or when a first form is completed after other subsequently-started forms have been completed.

For form images where there was not a notice or indication of a new form when the user started the new form, the software can check a first situation to determine if a certain percentage of the form has data that were written at one time, and has other data that was written at a subsequent time. The data that were written at the first time and the data that was written at the second time should be separated by a certain amount of time. Also, the software can check for a second situation to determine if a certain area or region of the form has data written at one time, and that area or region has other data that were written at a subsequent time. Alternatively, the software can check to see if two different areas of the form have data that were written at different times. The data that were written at the first time and the data that were written at the second time should be separated by a certain amount of time. In a third situation, the software can check for a certain number of data fields on the form that have a certain percentage of data that was written at different times. In a fourth situation, the software can check to see if the form has data that were overwritten, where the same areas or fields of the forms have at least two data entries where only one data entry should be accepted.

For form entries of when there was an incorrect notice or indication that a new form was started, or when a first form is completed after other subsequently-started forms have been completed, the software can check for errors or overwriting conditions in at least three situations. In a first situation, the software can check to determine if the form has a certain percentage of the fields on the form that has ink or has been completed. In a second situation, the software can check to see if certain mandatory fields of the form contain ink or have been completed. In a third situation, the software can check to see if the form has a certain type of required writing on the form, such as a user's name or identification number. If a condition for any of these situations are satisfied, then there can be an indication that the user has started using a new form or other forms have been started before the first form has been completed.

In some implementations, when any of the above seven situations are recognized by the software, the user can be notified of the error and the processing of the form image can be suspended. Optionally, questionable form images could be separated out from the writing process and retained for later resolution.

Regardless of when the user decides to resolve the problem, a graphical user interface (GUI) can display (1) the form image exhibiting the problem, and (2) either a blank form to separate the form image data on to the blank form, or other form images in a batch to get data from an image or to move data to an image. Controls can be provided on the GUI to select at least one of the form images from where the data can be moved to or from other form images. In some implementations, a slider control can be used that is based on the time stamp of the ink. The slider control can be used to move the data to or from other form images based on the time the ink was written. This can allow the user (or data collector) to easily separate the overwritten data from a single image of the form to multiple form images based on when the data was written. The user (or data collector) can also combine data on a single form image from form images that had data that were incorrectly separated into multiple form images. In some implementations, the software can use the missing response data and/or time stamps for the overlaps in the response data to suggest the best possible correction.

FIG. 17A show example views of data changes on form images in various time periods. The current/reference form image 1702 is shown in FIG. 17A. The current form image 1702 shows the form image as it is currently existing, including any data written on the form. In some implementations, the reference form image 1702 represents a reference image of the form as it stood at a point in time. There could be future or prior images of the form image that show how the form existed prior to the reference image or how the form existed at a time period after the reference image was created.

The prior image of the form 1704 is shown and represents a version of the form image as it existed in a previous state or time period. The future/subsequent image of the form 1706 is also shown. FIG. 17A may represent a GUI where a user can move data between the different versions of the form at different time periods.

There is a "Present−1" button or selector 1701 for a prior image of the form 1704 to allow a GUI user to control a selection of any form any prior to a current/reference form image 1702. Data in the prior image of the form 1704 can be moved to or from the current/reference form image 1702. In some implementations, the selection of the button 1701 can be used to open a blank form so that data from the current/reference form image 1702 can be separated and moved onto the blank form. There is also a "Present+1" button or selector 1703 for a future/subsequent image of the form 1706 to allow the GUI user to control a selection of any form any future form to a reference form image 1702. Data in the future/subsequent image of the form 1706 can be moved to or from the reference form image 1702. In some implementations, the selection of the button 1703 can be used to open a blank form so that data from the reference form image 1702 can be separated and moved onto the blank form. In some implementations, other buttons can be displayed to present other forms at different time periods, such as buttons for "Present+2," "Present+3," "Present−2," or "Present−3," and so on.

There are also one or more controls 1708A, 1708B, 1710A, 1710B to control the movement of data from the current (or reference) image to a prior image of the form 1704 or a future image of the form 1706. A center area of a control timeline 1708A, 1708B shows a current or reference time that relates to the current/reference form 1702. In some implementations, the slider control 1710A can be moved to the left to move one or more data items from the current/reference form 1702 to the prior image of the form 1704. The slider control 1710A can be moved to the right to move one or more data items from the prior image of the form 1704 to the current/reference form 1702. The slider control 1710B can be moved to the left to move one or more data items from the future image of the form 1706 to the reference or current/reference form 1702.

The slider control 1710B can be moved to the right to move one or more data items from the reference form 1702 to the future image of the form 1706. In this respect, the GUI shown in FIG. 17A can be used to ensure that the correct data is placed on the correct form image, regardless of the time the data are entered on the forms.

In some implementations, the direction of the movement of the slider control and the corresponding response data movement between images of the form can be in a reverse direction from the direction described above. In some implementations, the data can be moved with a drag-and-drop (e.g., selection and de-selection) from a mouse or touchpad. In other implementations, data in the form images can be selected with a mouse, and the data can be moved according to the GUI controls 1708A, 1708B, 1710A, 1710B.

Figure 17B:
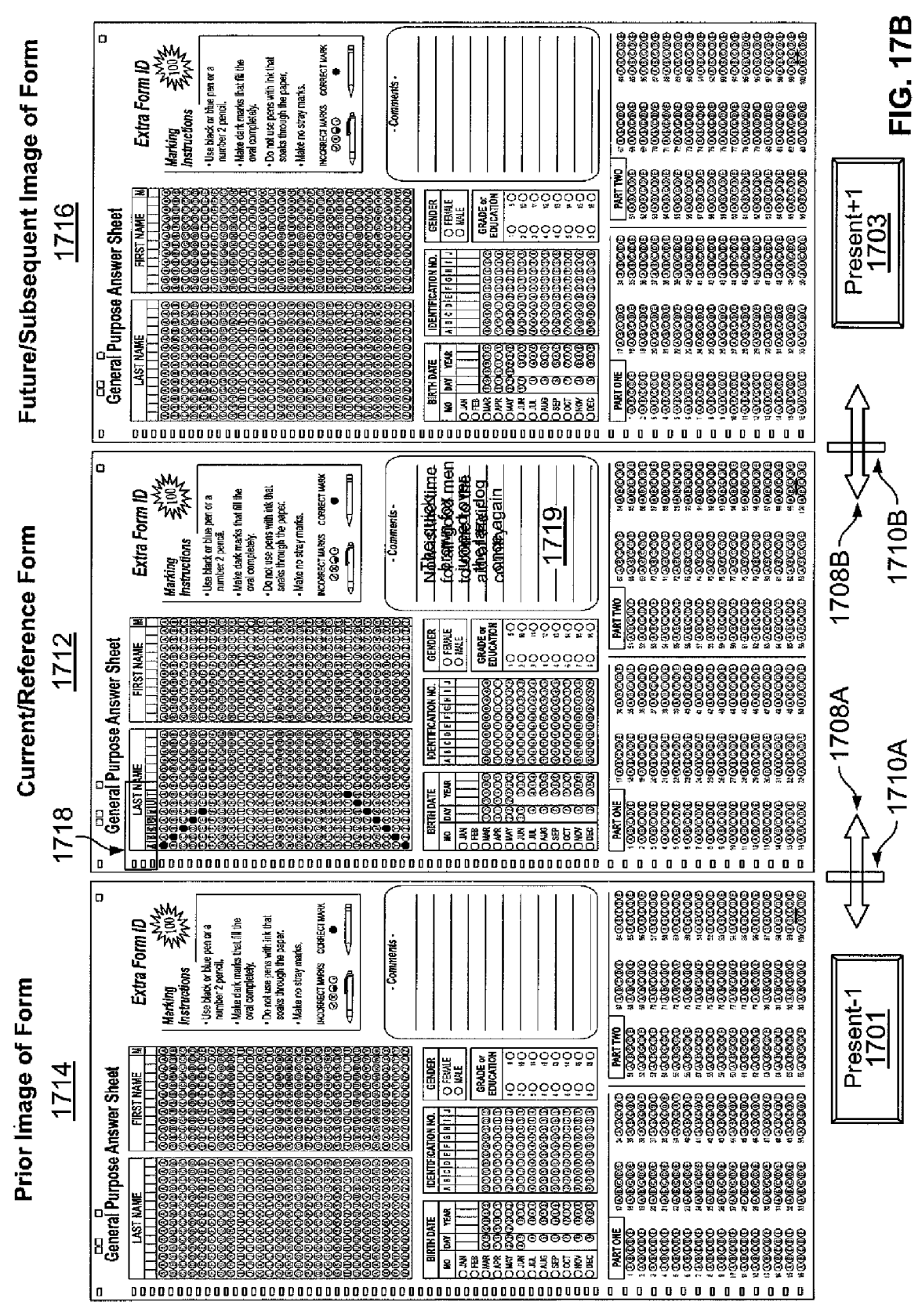
Figure 17C:

FIGS. 17B-17D show an example where data from a current/reference form 1712 are separated onto other form images. In FIG. 17B, the current/reference form image 1712 has areas 1718, 1719 where data in the form has been overwritten. In one example technique to separate the overwritten data in the form image 1712, a blank image is opened 1712 by selecting the "present−1" button 1701. Then, as shown in FIG. 17C, the slider control 1710A is moved to cause the earlier data on the current/reference form 1712 to move to the prior image of the form 1714 (i.e., the blank form image). The overwritten data in 1719, 1718 in the current/reference form image 1712 is moved to corresponding areas 1723, 1721 in the prior image of the form 1714. Then, as shown in FIG. 17D, the slider control 1710A is moved again to cause the earlier data on the current/reference form 1712 to move to the prior image of the form 1714 (i.e., the blank form image). The overwritten data in 1719 in the current/reference form image 1712 is moved to corresponding areas 1723 in the prior image of the form 1714.

Figure 17E:
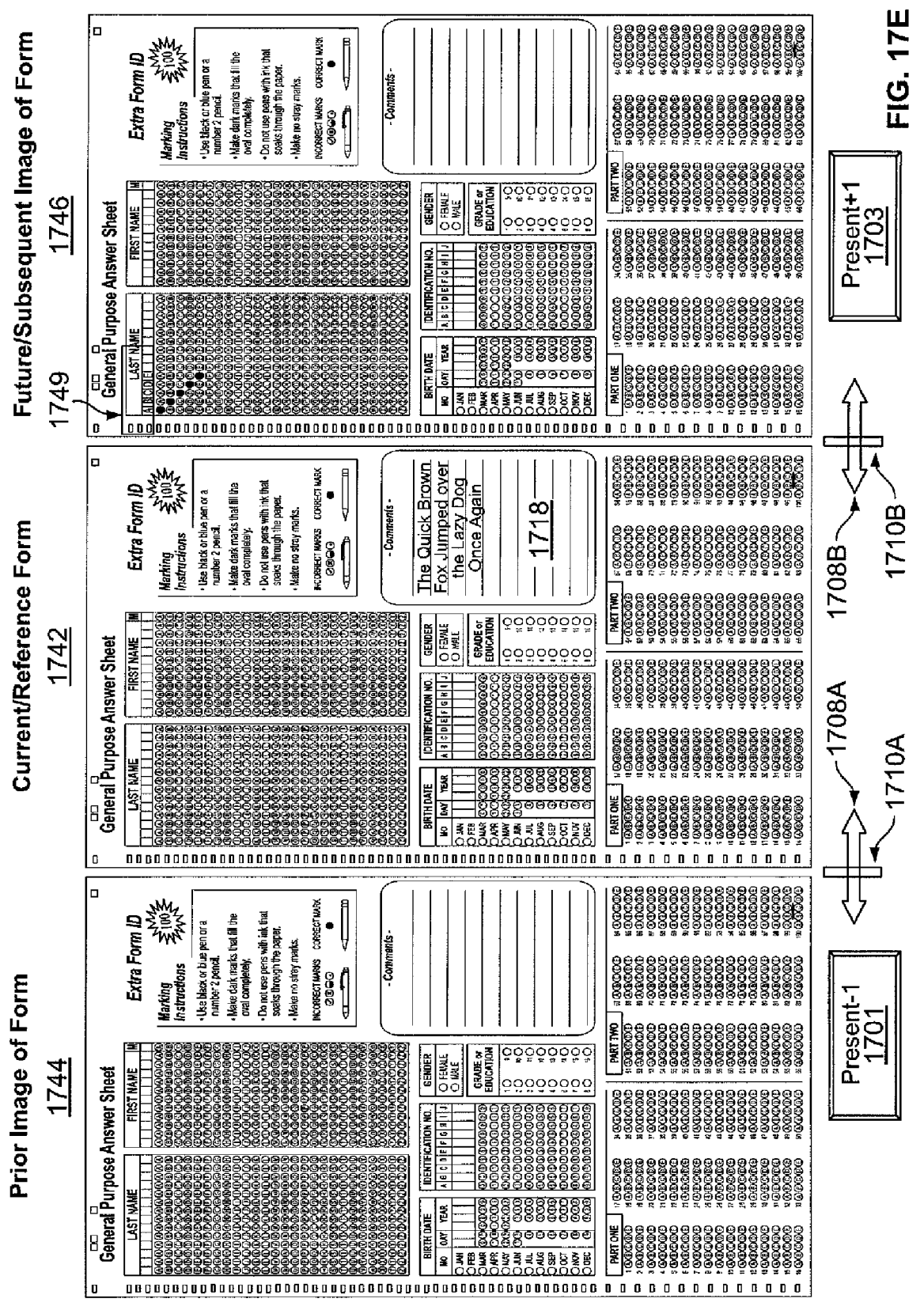
Figure 17F:
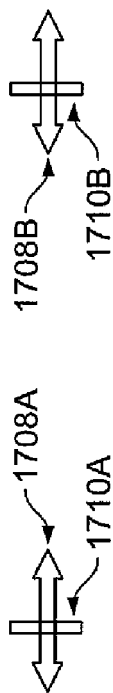
Figure 17G:
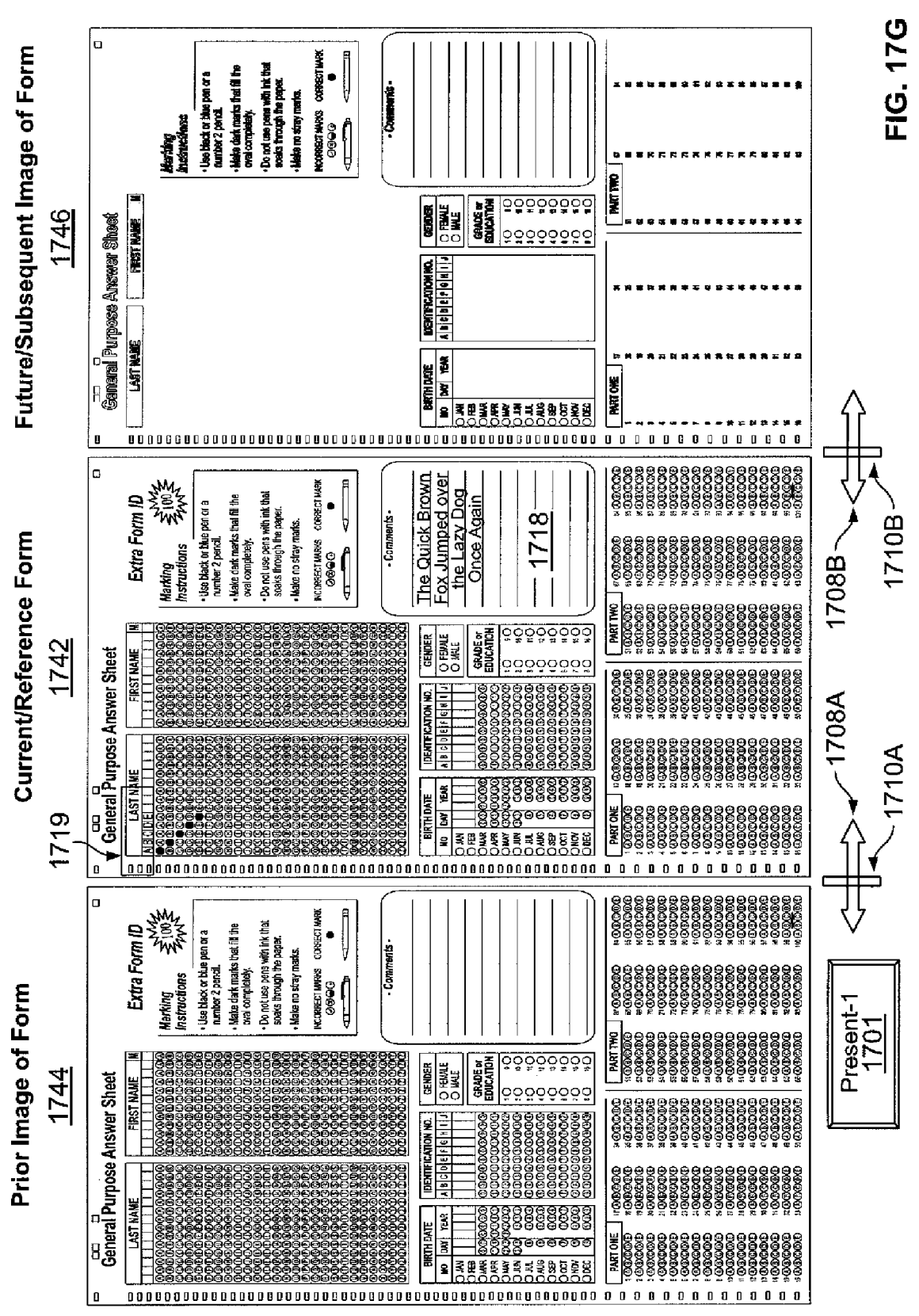

FIGS. 17E-17G show an example of gathering data from an inadvertently or purposely separated form. In FIG. 17E, the future/subsequent image of the form 1746 has data 1749 that should be combined with the current/reference form image 1742. The future form image 1746 can be selected by selecting the "Present+1" indicator 1703. In some implementations, the form image that has the data to be combined with a current/reference form image may or may not be a next form image if other forms were completed between the time the current/reference form was started and the future form was completed. As shown in FIG. 17F, some of the data 1749 from the future/subsequent image of the form 1746 is moved to a corresponding area 1719 in the current/reference form image 1742 by moving the slider control 1710B. As shown in FIG. 17G, the remainder of the data 1749 from the future image of the form 1746 is moved to the corresponding area 1719 in the current/reference form image 1742 by again moving the slider control 1710B. In some implementations, if all data from the future/subsequent image of the form 1746 are removed or has been combined with the reference image, the future image of the form 1746 can be automatically deleted from view.

Time-Based Fraud Detection Techniques for Scannable Forms

Figure 18B:
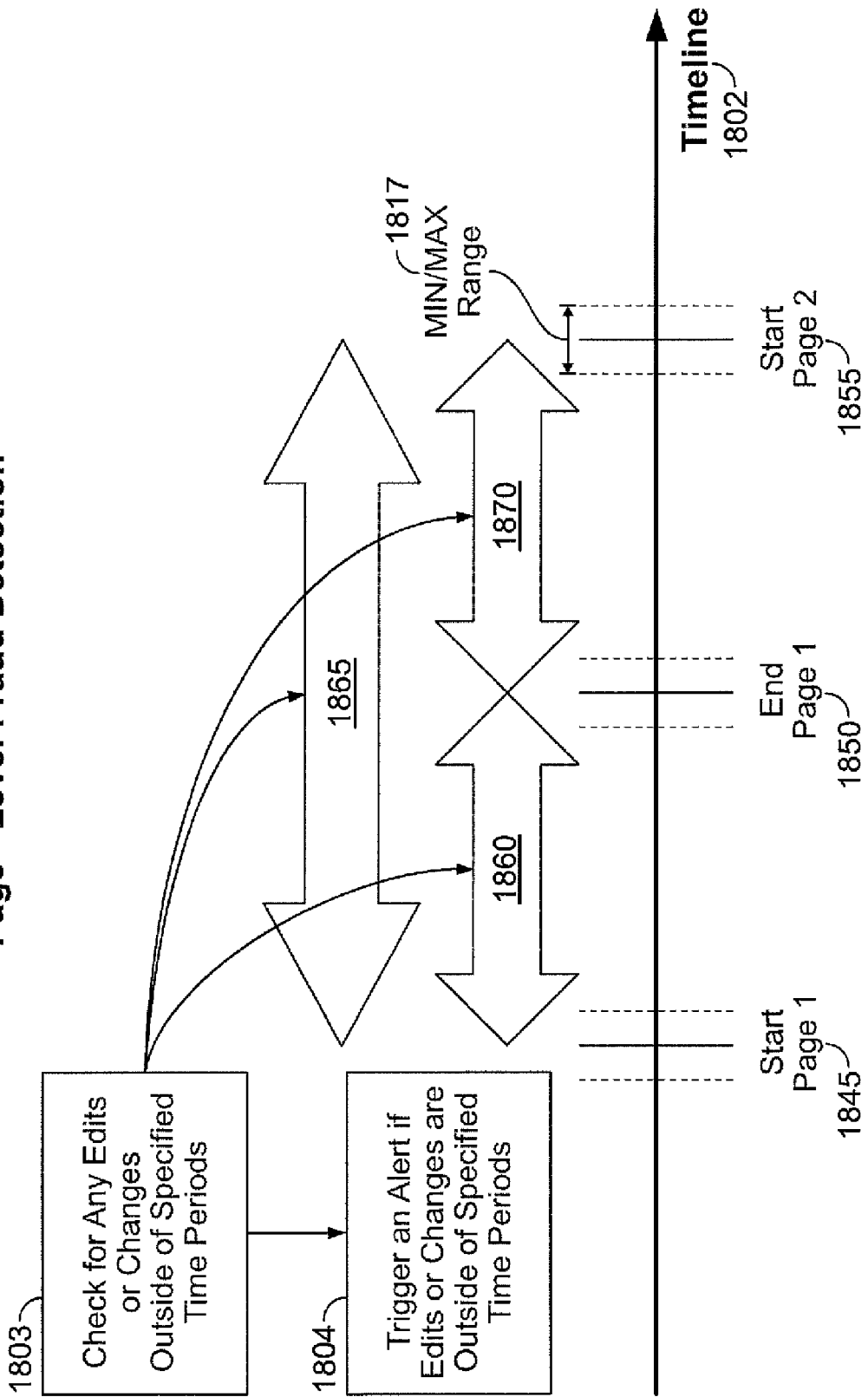
Figure 18C:
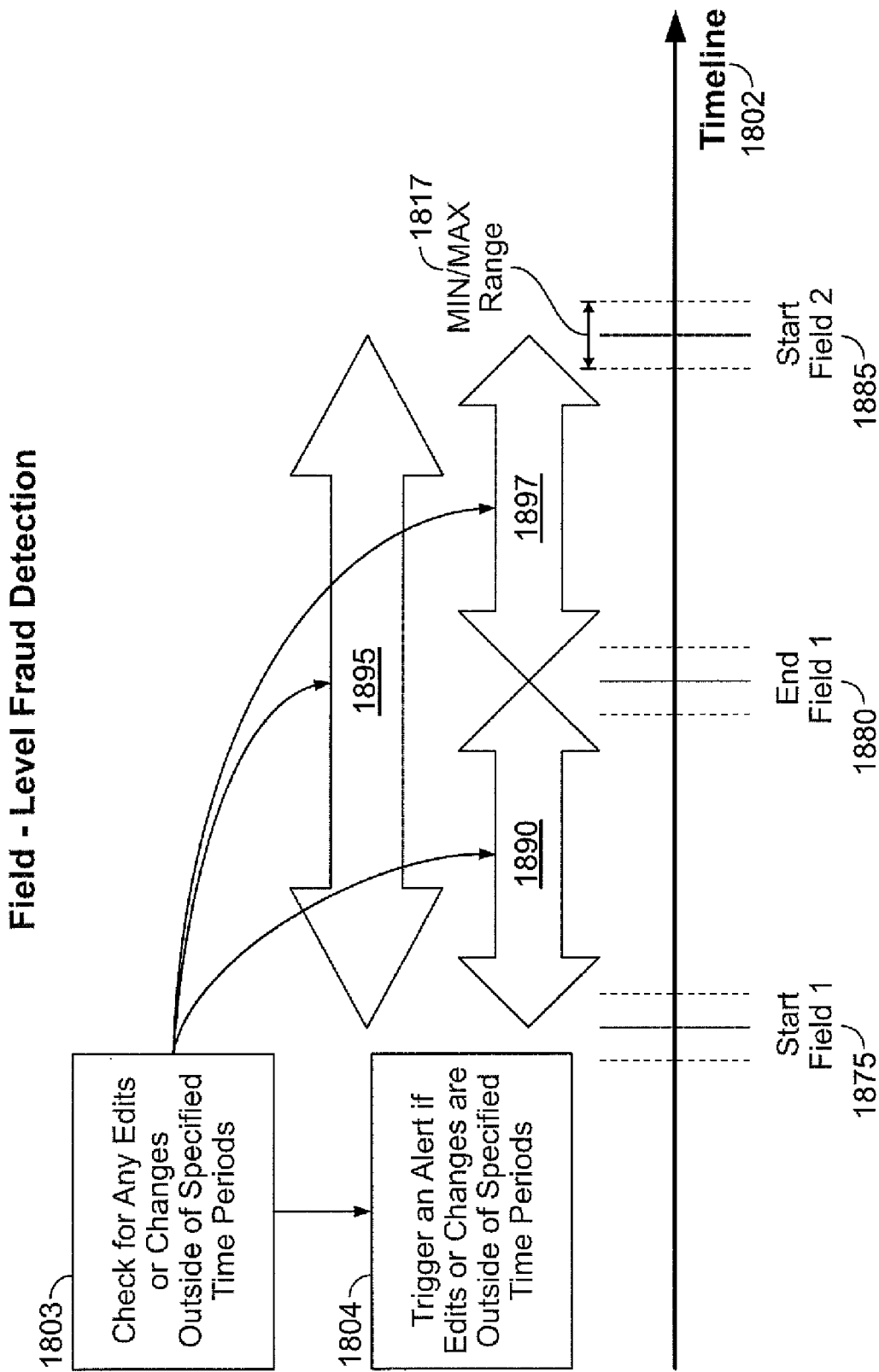

FIGS. 18A-18C illustrate example time-based fraud-detection mechanisms for documents, sheets, and document fields on a timeline. The time-based fraud-based techniques prevent a form user or subsequent form users from altering or re-arranging form and census data after data has been properly entered. Generally, one of the issues with data collection is when some individuals insert false response data into forms before the data collection instead of simply collecting the response data that is already on the form. The pen-camera device can provide a time stamp related to any data written on the form. The time stamp can be used to check the time period for which data were entered or edited to check for fraud (1803). The detection can be from document to document, page to page, or within or between fields on a page.

FIG. 18A illustrates an example document-level fraud detection scheme using the pen-camera device. In particular, FIG. 18A shows a timeline 1802 with markers for a first time 1805 that a pen-camera device user starts writing on document 1, a second time 1810 that the user ends writing on document 1, a third time 1815 that the user starts writing on document 2. Arrows 1820, 1825, 1835 in the figure indicate a writing time 1820 between the first and second times 1805, 1810, a break time 1830 between the second and third times 1810, 1815, and a total time 1825 between the first time 1805 and the third time 1815. For each marker, there can be minimum and maximum values 1817 around the times 1805, 1810, 1815 to allow for some time variations.

For document level edits, software associated with the pen-camera device can detect changes during (or after) data collection and recognize when a fraud-type situation may be occurring (1803). In such cases, the software can stop the user from making the edits, reject subsequent edits made by the user, or flag the edits so that they can be verified later (1804). In some implementations, to ensure that the document is not filled out too fast to allow for the data collection and to ensure that the document was filled out in one session (e.g., a session for a student's test), there can be a user-selectable minimum and maximum duration for a time period 1820 set from the start of the document (e.g., start document 1 (1805)) to the end of that document (e.g., end document 1 (1810)). The user-selectable minimum and maximum durations may be set, for example, by a testing administrator or a census data agency.

In other implementations, to ensure that the data collection process was as expected and to ensure that the data collection process was continuous, there can be a user-selectable minimum and maximum duration for a time period 1825 set from the start of the document (e.g., start document 1 (1805)) to the start of another document (e.g., start document 2 (1815)). In some implementations, to ensure that two documents were not filled out too close in time to each other to allow for data from another data source and to ensure that the data collection process was continuous, there can be a user-selectable minimum and maximum duration for a time period 1830 set from the end of one document (e.g., end document 1 (1810)) to the start of another document (e.g., start document 2 (1815)).

FIG. 18B illustrates an example page-level fraud detection scheme using the pen-camera device. The page-level fraud detection techniques can be analogous to the document-level fraud detection techniques, except on a page level instead of a document level. For example, FIG. 18B shows a timeline 1802 with markers for a first time 1845 that a pen-camera device user starts writing on page 1, a second time 1850 that the user ends writing on page 1, a third time 1855 that the user starts writing on page 2. Arrows 1860, 1865, 1870 indicate a writing time 1860 between the first and second times 1845, 1850, a break time 1870 between the second and third times 1850, 1855, and a total time 1865 between the first time 1845 and the third time 1855. For each marker, there can be minimum and maximum values 1817 around the times 1845, 1850, 1855 to allow for some time variations. In some implementations, to ensure that pages were no filled out too fast to allow for the data collection and to ensure that the pages were completed in one session, there can be user-selectable minimum and maximum values for a duration of time period 1860 from the start of page 1 to the end of page 1.

FIG. 18C illustrates an example field-level fraud detection scheme using the pen-camera device. The field-level fraud detection techniques can be analogous to the document-level fraud detection techniques, except on a field level instead of a document level. The field itself refer to a region, area, or location for data within a page of the document. For example, FIG. 18C shows a timeline 1802 with markers for a first time 1875 that a pen-camera device user starts writing on field 1, a second time 1880 that the user ends writing on field 1, and a third time 1885 that the user starts writing on field 2. Arrows 1860, 1865, 1870 indicate a writing time 1890 between the first and second times 1875, 1880, a break time 1897 between the second and third times 1880, 1885, and a total time 1895 between the first time 1875 and the third time 1885. For each marker, there can be minimum and maximum values 1817 around the times 1875, 1880, 1885 to allow for some time variations.

There can be various implementations of the field-level fraud detection scheme. For example, to ensure that data collection for a field was not improperly rushed, but collected at approximately the same time as other data on the form, there can be user-selectable minimum and maximum duration times set for a time period 1890 from the start of a field data entry (e.g., start field 1 (1875)) to the end of that field data entry (e.g., end field 1 (1880)). In other implementations, to ensure that the data for a field was present during data collection and collected at the same time as other data fields, there can be user-selectable minimum and maximum durations for a time period 1897 from the end of a data entry in a field (e.g., end field 1 (1880)) to the start of another field data entry (e.g., start field 2 (1885)). In some implementations, to ensure that data for a field is collected at a given time (e.g., 5 pm EST) or a number of times in a time period (e.g., once a day, twice a day, once a week, or other time period-based data collection), there can be user-selectable minimum and maximum durations 1817 for a time period (e.g., time period 1897) from the end of one field to a start of another specified field.

Although only a few implementations have been disclosed in detail above, other implementations are possible and the inventor(s) intend these to be encompassed within this specification. The specification describes a few specific examples to accomplish a more general goal that may be accomplished in another way. This disclosure is intended to be exemplary, and the claims are intended to cover any modification or alternative which might be predictable to a person having ordinary skill in the art.

Collection of response data may occur in a networked environment. While the techniques of collecting responses are described in terms of methods, systems for implementing the techniques are also possible, using computer and/or scanner technology.

The disclosed techniques can be used on one or more computers. One or more methods and/or algorithms and/or processes herein can be implemented with, or employed in computers and/or video display, transmission, processing, and playback systems. The computers described herein may be any kind of computer, either general purpose, or some specific purpose computer such as a workstation. The computer may be, e.g., an Intel or AMD based computer, running Windows XP, Vista, or Linux, or may be a Macintosh computer. In some implementations, the computer can also be, e.g., a handheld computer, such as a PDA, cell phone, or laptop. The computer may also refer to machines or parts of a machine for image recording or reception processing, storage, and distribution of data, in particular video data.

Computer and/or graphic programs may be written in C or Python, or Java, Brew or any other programming language.

The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium. The programs may also be run over a network, for example, with a server or other machine sending communications to the local machine, which allows the local machine to carry out the operations described herein.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated, processed communication, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a graphical system, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows and figures described and shown in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor can receive instructions and data from a read only memory or a random access memory or both. The essential elements of a computer are a processor for performing instructions and one or more memory devices for storing instructions and data. Generally, a computer can also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, some implementations of the subject matter described in this specification can be implemented on a computer having a display device, e.g., a CRT (cathode ray tube), LCD (liquid crystal display), or plasma display monitor, for displaying information to the user and a keyboard and a selector, e.g., a pointing device, a mouse, or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Some implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software or hardware product or packaged into multiple software or hardware products.

Other modifications are within the scope of the following claims.

What is claimed is:

1. A system for collection of responses from users of scannable forms, comprising:
    a scannable form comprising:
        (i) a position-coding pattern comprising a plurality of unique patterns,
        (ii) at least two response areas for receipt of information from a user of the form, and
        (iii) two or more location marks indicating a referenceable physical location on the scannable form, wherein the response areas are positioned in a specified relation to the location marks;
    a pen-camera device for optically detecting the position-coding pattern and marking the scannable form with response marks in at least one of the response areas, wherein the pen-camera device is configured to have a location of the pen-camera device on the scannable form identified with the position-coding pattern;
    a scanner configured to optically detect the location marks and the response marks; and
    a form definition file that associates scanned content from the scanner with location information from the pen-camera device, the form definition file comprising:
        (i) a first form layout for referencing the scanned content and position information for the at least two response areas, the first form layout being configured to be referenced with the scanner; and
        (ii) a second form layout for the position-coding pattern for identifying locations of the pen-camera device on the scannable form when marking the scannable form,
    wherein the first form layout and the second form layout of the form definition file are configured to provide information to enable a comparison of the scanned content and the position information for the at least two response areas with a position-coding pattern for the identified locations of the pen-camera device on the scannable form.

2. The system of claim 1, wherein the position-coding pattern is invisible to a human eye.

3. The system of claim 1, wherein the location marks comprise timing marks that are located along one edge of the scannable form, wherein at least one of the timing marks is horizontally aligned with at least one response field.

4. The system of claim 1, wherein the location marks are superimposed on the position-coding pattern.

5. A method for collecting data from a form, the method comprising:
    receiving, from a scanner, scanned response data from a scannable form that comprises at least two response areas for receipt of information from a user of the form;
    reading, from a pen-camera device, location information from the scannable form, the scannable form further comprising a position-coding pattern having a plurality of unique patterns, the pen-camera device optically detecting the location information using the position-coding pattern when the scannable form is marked with response marks; and
    referencing a form definition file that associates the scanned response data from the scanner with the location information from the pen-camera device, the form definition file including:
        (i) a first form layout for indicating content and position information for the at least two response areas, the first form layout being configured to be referenced with the scanner; and
        (ii) a second form layout for the position-coding pattern for identifying locations of the pen-camera device on the scannable form when the scannable form is marked;
    comparing the scanned response data using the first form layout of the form definition file with the read location information using the second form layout of the form definition file; and
    providing a result based on the comparison.

6. The method of claim 5, further comprising using the location information to track a path of the pen-camera device on the scannable form, wherein the comparison relates to an error checking of the scanned response data with the read location information.

7. The method of claim 6, further comprising storing the location information from the pen-camera device and the received scanned response data from the scannable form.

8. the system of claim 1, scannable form further comprising:
    an area for encoded information that identifies a location and arrangement of the position-coding pattern on the scannable form.

9. The system of claim 8, the scannable form further comprising timing marks that are located along one edge of the scannable form, wherein at least one of the timing marks is horizontally aligned with at least one response field.

10. The system of claim 8, wherein the area for the encoded information further identifies a type of scannable form.

11. The system of claim 8, wherein the encoded information comprises binary encoded information.

12. The system of claim 8, wherein the position-coding pattern is invisible to a human eye, and wherein location marks are superimposed on the position-coding pattern.

13. A computer program product, encoded on a non-transitory computer-readable medium, comprising instructions to cause data processing apparatus to perform operations for collecting data from a form, the operations comprising:
    receiving, from a scanner, scanned response data from a scannable form that comprises at least two response areas for receipt of information from a user of the form;
    reading, from a pen-camera device, location information from the scannable form, the scannable form further comprising a position-coding pattern having a plurality of unique patterns, the pen-camera device optically detecting the location information using the position-coding pattern when the scannable form is marked with response marks; and
    referencing a form definition file that associates the scanned response data from the scanner with the location information from the pen-camea device, the form definition file including:
        (i) a first form layout for indicating content and position information for the at least two response areas, the first form layout being configured to be referenced with the scanner; and (ii) a second form layout for the position-coding pattern for identifying locations of the pen-camera device on the scannable form when the scannable form is marked;

comparing the scanned response data using the first form layout of the form definition file with the read location information using the second form layout of the form definition file; and providing a result based on the comparison.

14. A computer program product of claim 13, the operations further comprising:

reading encoded information from a region of the scannable form that identifies a location and arrangement of the position-coding pattern on the scannable form.

15. The computer program product of claim 14, further comprising instructions for using the encoded information to identify a type of scannable form.

16. The computer program product of claim 15, wherein the region of the scannable form is between the at least two response areas.

17. A form definition file configured to associate scanned content from an optical scanner with location information from a pen-camera device, the form definition file comprising:

(i) a first form layout for referencing scanned content and position information for at least two response areas on a scannable form, the scannable form comprising:

a position-coding pattern comprising a plurality of unique patterns;

the at least two response areas for receipt of information from a user of the form; and two or more location marks indicating a referenceable physical location on the scannable form, wherein the response areas are positioned in a specified relation to the location marks; and wherein the first form layout is configured to be referenced with an optical scanner; and (ii) a second form layout for the position-coding pattern for identifying locations of a pen-camera device on the scannable form when marking the scannable form, the pen-camera device being configured to optically detect the position-coding pattern and to mark the scannable form with response marks in at least one of the response areas, wherein the pen-camera device is configured to have a location of the pen-camera device on the scannable form identified with the position-coding pattern, and wherein the first form layout and the second form layout of the form definition file are configured to provide information to enable a comparison of the scanned content and the position information for the at least two response areas with a position-coding pattern for the identified locations of the pen-camera device on the scannable form.

* * * * *